(12) United States Patent
Hritz

(10) Patent No.: US 10,077,800 B2
(45) Date of Patent: Sep. 18, 2018

(54) RADIALLY CONFIGURED OIL-FREE COMPRESSOR

(71) Applicant: Westinghouse Air Brake Technologies Corporation, Wilmerding, PA (US)

(72) Inventor: Jeffrey Hritz, Jefferson Hills, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 155 days.

(21) Appl. No.: 14/705,339

(22) Filed: May 6, 2015

(65) Prior Publication Data

US 2015/0322933 A1 Nov. 12, 2015

Related U.S. Application Data

(60) Provisional application No. 61/990,974, filed on May 9, 2014.

(51) Int. Cl.
*F04B 41/06* (2006.01)
*F16C 7/02* (2006.01)
(Continued)

(52) U.S. Cl.
CPC ............ *F16C 7/023* (2013.01); *F04B 1/0531* (2013.01); *F04B 1/0536* (2013.01); *F04B 25/00* (2013.01); *F04B 27/0404* (2013.01); *F04B 27/0423* (2013.01); *F04B 35/01* (2013.01); *F04B 35/04* (2013.01); *F04B 39/0094* (2013.01); *F04B 39/066* (2013.01); *F04B 41/06* (2013.01); *Y10T 74/2142* (2015.01)

(58) Field of Classification Search
CPC ........ F04B 1/04; F04B 1/0404; F04B 1/0408; F04B 1/0421; F04B 1/0439
See application file for complete search history.

(56) References Cited

U.S. PATENT DOCUMENTS 2,146,493 A 2/1939 Wintzer
4,458,555 A 7/1984 Holtzberg et al.
(Continued)

FOREIGN PATENT DOCUMENTS

CN 202300894 U 7/2012
EP 0836004 A2 4/1998
JP 9273534 A 10/1997

*Primary Examiner* — Patrick Hamo
(74) *Attorney, Agent, or Firm* — The Webb Law Firm

(57) ABSTRACT

An oil-free compressor for a rail vehicle includes a compressor housing, a first low pressure piston cylinder supported in the compressor housing, a second low pressure piston cylinder supported in the compressor housing, a first high pressure piston cylinder supported in the compressor housing, a second high pressure piston cylinder supported in the compressor housing, and a crankshaft assembly supported by the compressor housing and linked to pistons of the piston cylinders by respective connecting rods. The first and second low pressure piston cylinders and the first and second high pressure piston cylinders are positioned in an X-shaped configuration around an outer circumference of the compressor housing. The first and second high pressure piston cylinders are configured as first and second lower legs of the X-shaped configuration, and the first and second low pressure piston cylinders are configured as first and second upper legs of the X-shaped configuration.

18 Claims, 17 Drawing Sheets

(51) Int. Cl.

| | | |
|---|---|---|
| | *F04B 25/00* | (2006.01) |
| | *F04B 1/053* | (2006.01) |
| | *F04B 39/00* | (2006.01) |
| | *F04B 39/06* | (2006.01) |
| | *F04B 35/01* | (2006.01) |
| | *F04B 27/04* | (2006.01) |
| | *F04B 35/04* | (2006.01) |

(56) References Cited

U.S. PATENT DOCUMENTS

| | | |
|---|---|---|
| 4,494,286 A | 1/1985 | Kaufman |
| 4,555,961 A | 12/1985 | Fischer |
| 4,930,405 A | 6/1990 | Lilie |
| 4,968,219 A * | 11/1990 | Fisher-Votava ......... F04B 25/00 416/53 |
| 5,758,550 A | 6/1998 | Lenczyk |
| 6,125,536 A | 10/2000 | Spurny |
| 6,282,983 B1 | 9/2001 | Evans |
| 6,293,764 B1 * | 9/2001 | Baumann ................ F04B 39/00 417/255 |
| 6,595,187 B1 | 7/2003 | Russell |
| 6,659,739 B2 | 12/2003 | Varney et al. |
| 6,776,587 B2 * | 8/2004 | Meyer ..................... F04B 27/02 417/248 |
| 7,895,919 B2 * | 3/2011 | Vicars ..................... F16C 7/023 74/579 R |
| 8,608,455 B2 * | 12/2013 | Ishida ..................... F03C 1/053 417/273 |
| 8,932,029 B2 * | 1/2015 | Komatsu ................. F01B 1/062 417/273 |
| 2003/0101847 A1 | 6/2003 | Harimoto et al. |
| 2011/0038740 A1 | 2/2011 | Goertzen et al. |
| 2012/0192710 A1 | 8/2012 | Moore et al. |
| 2015/0075369 A1 | 3/2015 | Kapadia et al. |

\* cited by examiner

RADIALLY CONFIGURED OIL-FREE COMPRESSOR

CROSS REFERENCE TO RELATED APPLICATION

This application claims the benefit of U.S. Provisional Application No. 61/990,974, filed May 9, 2014, the disclosure of which is hereby incorporated by reference in its entirety.

BACKGROUND OF THE INVENTION

Field of the Invention

The present disclosure relates to the field of air compressors adapted for use on rail vehicles for supplying compressed air to pneumatic units associated with the rail vehicle and, in particular, to an oil-free air compressor on a rail vehicle for supplying compressed air to various pneumatic units associated with the rail vehicle.

Description of Related Art

The use of a multiple stage, multiple cylinder air compressor is well known in the art. It is common practice to use a multiple stage, multiple cylinder air compressor on a locomotive or other rail vehicle to provide compressed air that is consumed by various pneumatic devices throughout the locomotive and railcars to provide a variety of critical functions. One of these primary functions is to operate the locomotive and railcar brakes. The traditional oil-flooded reciprocating compressors utilized commonly throughout North America are three cylinder, two stage compressors that are available in many different models and configurations. One of the most common configurations for a compressor is a compressor with two first stage or low pressure cylinders and one second stage or high pressure cylinder. This compressor is often configured in a "W" configuration with the low pressure cylinders banked at 60 degrees to each side of the vertical high pressure cylinder. The compressor utilizes a large oil sump to provide lubrication and internal component cooling.

A less common and more recent approach to a locomotive air compressor is to use oil-free reciprocating compressors in place of the traditional oil flooded variety. This oil-free technology reduces the need for a large oil sump in the compressor housing and allows for different cylinder configurations to achieve specific improvements such as torque pulse control, dynamic balancing, and overall size reductions. A problem commonly associated with the new oil-free reciprocating compressors is overheating, which can lead to the compressor shutting down or operating at an inefficient level. Some current oil-free reciprocating compressors also experience high torque pulses and uneven dynamic balancing and are designed to improve one of these features at the expense of the other or at the expense of a larger overall compressor size. An example of an oil-free air compressor for a rail vehicle is disclosed in U.S. patent application Ser. No. 14/030,588 to Kapadia et al., filed on Sep. 18, 2013, incorporated herein in its entirety.

By nature of its design, a reciprocating compressor transfers rotary motion of a crankshaft to reciprocating motion of one or more pistons through a matched number of connecting rods. A reciprocating air compressor uses a connecting rod to connect the rotating crankshaft (at a crank pin) to reciprocating pistons (at a wrist pin). The connections between the wrist pin, piston, connecting rod, and crankshaft must include a bearing surface capable of handling the oscillating or rotating motion and the associated loads from inertial, frictional, and gas compression forces. There are many acceptable bearing types and mounting methods used to create a reliable bearing and component assembly. The connecting rods contain bearings to transfer load and motion from the compressor crankshaft through the connecting rod to the wrist pin and piston assembly.

In a traditional oil-flooded air compressor, the bearings may be of a variety of the types such as plain bearings, ball bearings, rollers bearings, etc., as the oil provides necessary cooling and lubrication. This variety allows the use of split bearings which aid in the assembly of the air compressor. In an oil-free air compressor, a variety of bearings may also be utilized. There are advantages, however, to using single piece bearings as opposed to split bearings, especially in regards to the life of the air compressor and the design simplicity. At the same time, these advantages are offset by disadvantages of such designs of the connecting rods that affect the size of the air compressor, complexity to assemble the air compressor, maintainability, and the life of the air compressor.

There is a current need for an oil-free reciprocating compressor with a reduced overall size and a reduction in torque pulse. There is also a current need for an oil-free reciprocating compressor with improved dynamic balancing and improved air flow for cooling the cylinders of the compressor. There is also a current need for improved compressor housing ventilation. There is also a current need for a single piece bearing assembly on a crankshaft end of a connecting rod that can reduce the size of the connecting rod, improve the interchangeability of the connecting rods, improve the field of maintainability of the air compressor, and simplify installation of the connecting rod.

SUMMARY OF THE INVENTION

In one aspect, an oil-free compressor for a rail vehicle includes a compressor housing, at least two piston cylinders radially supported in the compressor housing, and a crankshaft assembly supported by the compressor housing and linked to pistons of the at least two piston cylinders by respective connecting rods.

The at least two piston cylinders may include a first and second low pressure piston cylinder radially supported in a first and second opening in the compressor housing, and a first and second high pressure piston cylinder radially supported in a third and fourth opening in the compressor housing. The first and second low pressure piston cylinders may be positioned between the first and second high pressure piston cylinders on the compressor housing. The first and second low pressure piston cylinders may be positioned approximately 72 degrees apart from one another. The first low pressure piston cylinder may be positioned approximately 72 degrees apart from the first high press piston cylinder, and the second low pressure piston cylinder may be positioned approximately 72 degrees apart from the second high pressure piston cylinder. The first low pressure piston cylinder, the second low pressure piston cylinder, the first high pressure piston cylinder, and the second high pressure piston cylinder may be spaced equally apart from one another. The first low pressure piston cylinder, the second low pressure piston cylinder, the first high pressure piston cylinder, and the second high pressure piston cylinder may be spaced approximately 72 degrees apart from one another. The first and second high pressure piston cylinders may be positioned approximately 18 degrees below a horizontal plane of the compressor. The compressor housing may have a substantially pentagonal cross-sectional shape. A cooling fan may be operatively connected to the crankshaft assembly. The cooling fan may create a flow path perpendicular to the piston cylinders. Each of the piston cylinders may be positioned in the flow path of the cooling fan.

In another aspect, an oil-free compressor for a rail vehicle includes a compressor housing, a first low pressure piston cylinder supported in the compressor housing, a second low pressure piston cylinder supported in the compressor housing, a first high pressure piston cylinder supported in the compressor housing, and a second high pressure piston cylinder supported in the compressor housing. The first and second low pressure piston cylinders and the first and second high pressure piston cylinders extend radially from a longitudinal axis of the compressor housing. The first and second low pressure piston cylinders and the first and second high pressure piston cylinders are positioned in a substantially straight line around an outer circumference of the compressor housing.

The first and second low pressure piston cylinders may be positioned between the first and second high pressure piston cylinders on the compressor housing. The first and second low pressure piston cylinders may be positioned approximately 72 degrees apart from one another. The first low pressure piston cylinder may be positioned approximately 72 degrees apart from the first high pressure piston cylinder, and the second low pressure piston cylinder may be positioned approximately 72 degrees apart from the second high pressure piston cylinder. The first low pressure piston cylinder, the second low pressure piston cylinder, the first high pressure piston cylinder, and the second high pressure piston cylinder may be spaced approximately 72 degrees apart from one another. The first and second high pressure piston cylinders may be positioned approximately 18 degrees below a horizontal plane of the compressor. A cooling fan may be operatively connected to the crankshaft assembly. The cooling fan may create a flow path perpendicular to the piston cylinders. A crankshaft assembly may be supported by the compressor housing and linked to pistons of the first and second low pressure piston cylinders and the first and second high pressure piston cylinders by respective connecting rods.

In another aspect, an oil-free compressor for a rail vehicle includes a compressor housing, a first low pressure piston cylinder supported in the compressor housing, a second low pressure piston cylinder supported in the compressor housing, a first high pressure piston cylinder supported in the compressor housing, a second high pressure piston cylinder supported in the compressor housing, and a crankshaft assembly supported by the compressor housing and linked to pistons of the piston cylinders by respective connecting rods. The first and second low pressure piston cylinders and the first and second high pressure piston cylinders may be positioned in an X-shaped configuration around an outer circumference of the compressor housing.

The first and second high pressure piston cylinders may be configured as first and second lower legs of the X-shaped configuration, and the first and second low pressure piston cylinders may be configured as first and second upper legs of the X-shaped configuration. An angular distance between the two lower legs of the X-shaped configuration may be greater than the distance between the two upper legs of the X-shaped configuration. The X-shaped configuration may be non-symmetrical about a horizontal plane passing through a longitudinal axis of the crankshaft assembly. The X-shaped configuration may be symmetrical about a vertical plane passing through a longitudinal axis of the crankshaft assembly. An angular distance between the first high pressure piston cylinder and the first low pressure piston cylinder, an angular distance between the first low pressure piston cylinder and the second low pressure piston cylinder, and an angular distance between the second low pressure piston cylinder and the second high pressure piston cylinder may be equal to one another. The first and second high pressure piston cylinders may be positioned below a horizontal plane passing through a longitudinal axis of the crankshaft assembly. An angular distance between the two lower legs of the X-shaped configuration may be less than an angular distance between the first lower leg, the first upper leg, the second upper leg, and the second lower leg of the X-shaped configuration. The compressor housing may have a pentagonal cross-sectional shape. A cooling fan may be operatively connected to the crankshaft assembly. The cooling fan may create a flow path substantially perpendicular to the piston cylinders. Each of the piston cylinders are positioned in the flow path of the cooling fan.

In yet another aspect, an oil-free compressor for a rail vehicle includes a compressor housing, a first low pressure piston cylinder supported in the compressor housing, a second low pressure piston cylinder supported in the compressor housing, a first high pressure piston cylinder supported in the compressor housing, a second high pressure piston cylinder supported in the compressor housing, a crankshaft assembly supported by the compressor housing and linked to pistons of the piston cylinders by respective connecting rods, and a cooling fan operatively connected to the crankshaft assembly. The first and second low pressure piston cylinders and the first and second high pressure piston cylinders are positioned in an X-shaped configuration around an outer circumference of the compressor housing.

The first and second high pressure piston cylinders may be configured as first and second lower legs of the X-shaped configuration, and the first and second low pressure piston cylinders may be configured as first and second upper legs of the X-shaped configuration. An angular distance between the two lower legs of the X-shaped configuration may be greater than the distance between the two upper legs of the X-shaped configuration. The X-shaped configuration may be non-symmetrical about a horizontal plane passing through a longitudinal axis of the crankshaft assembly. An angular distance between the first high pressure piston cylinder and the first low pressure piston cylinder, an angular distance between the first low pressure piston cylinder and the second low pressure piston cylinder, and an angular distance between the second low pressure piston cylinder and the second high pressure piston cylinder may be equal to one another. The X-shaped configuration may be symmetrical about a vertical plane passing through a longitudinal axis of the crankshaft assembly. The cooling fan may create a flow path substantially perpendicular to the piston cylinders. Each piston cylinder may be positioned in the flow path of the cooling fan. The first and second high pressure piston cylinders may be positioned below a horizontal plane passing through a longitudinal axis of the crankshaft assembly.

Further details and advantages will be understood from the following detailed description read in conjunction with the accompanying drawings.

DESCRIPTION OF THE PREFERRED EMBODIMENTS

Figure 1:
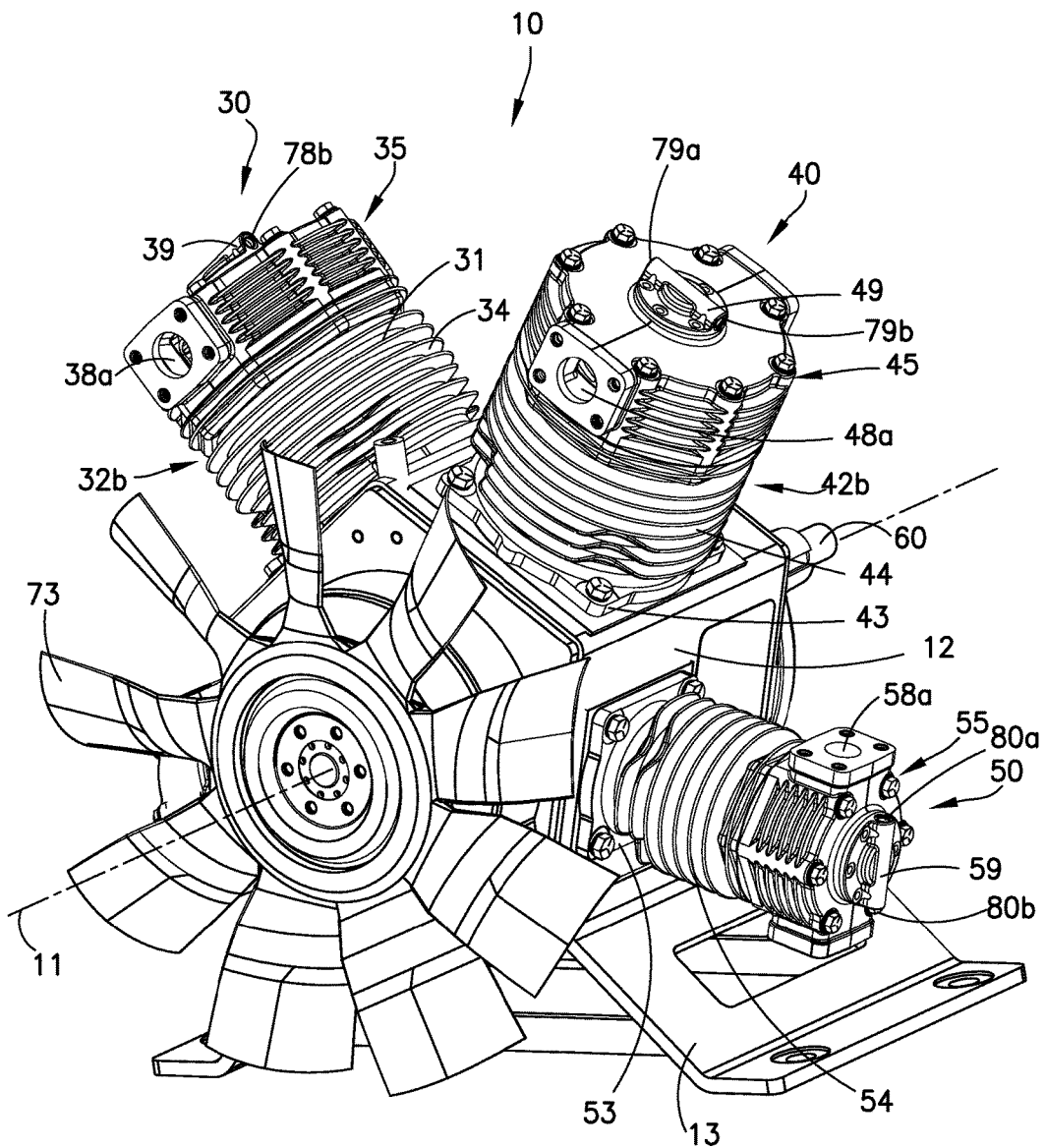
FIG. 1 is a front perspective view of a radially configured air compressor in accordance with this disclosure.
Figure 2:
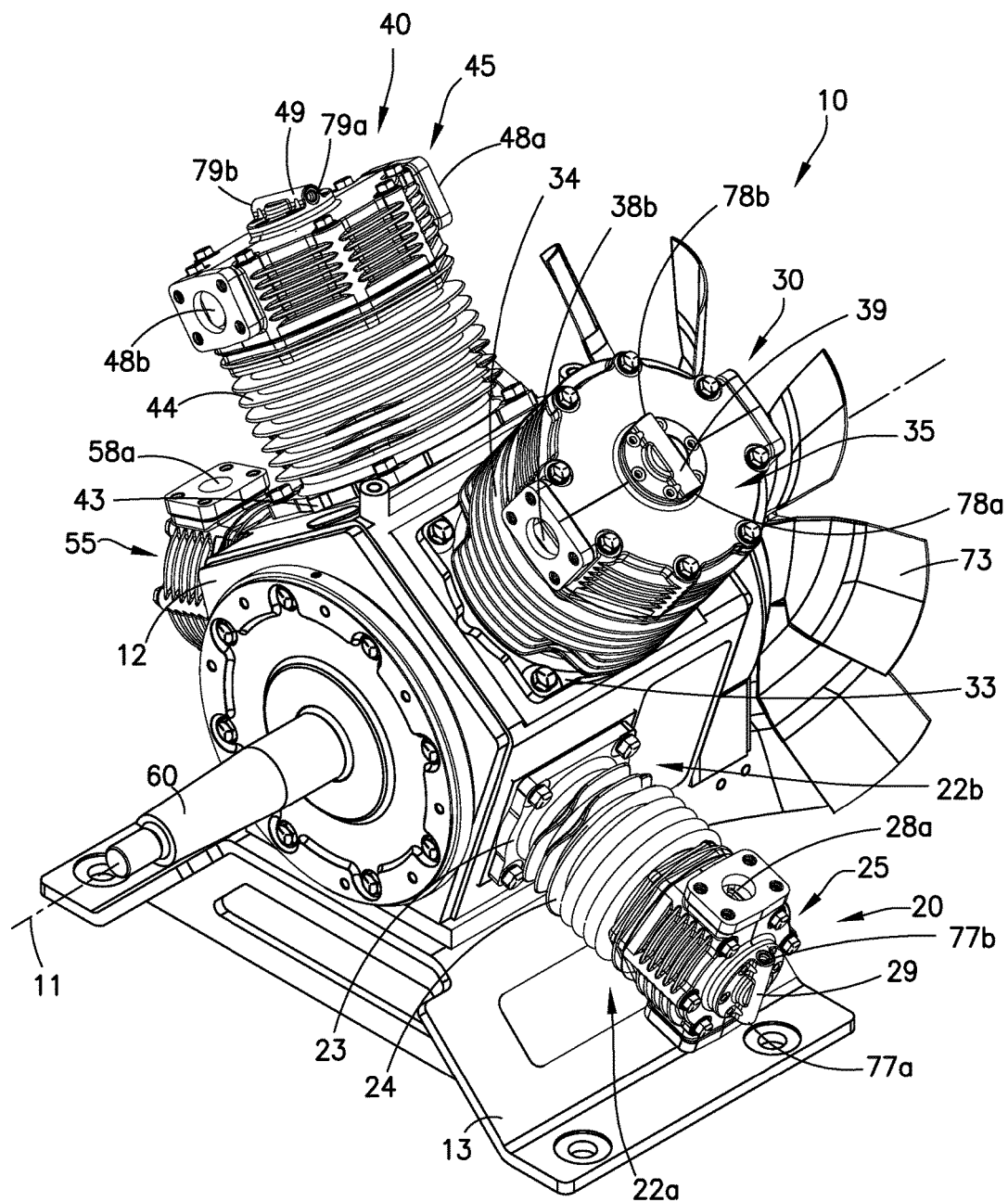
FIG. 2 is a rear perspective view showing the radially configured air compressor of FIG. 1.

For purposes of the description hereinafter, spatial orientation terms, as used, shall relate to the referenced aspect as it is oriented in the accompanying drawing, figures, or otherwise described in the following detailed description. However, it is to be understood that the aspects described hereinafter may assume many alternative variations and configurations. It is also to be understood that the specific components, devices, features, and operational sequences illustrated in the accompanying drawing, figures, or otherwise described herein are simply exemplary and should not be considered as limiting.

Referring to FIGS. 1-7, an air compressor 10 according to one aspect is shown. As shown, the air compressor 10 is a multi-cylinder air compressor 10 including at least a first piston cylinder 20, a second piston cylinder 30, a third piston cylinder 40, and a fourth piston cylinder 50. In one aspect, the air compressor 10 is an oil-free air compressor. The first piston cylinder 20, the second piston cylinder 30, the third piston cylinder 40, and the fourth piston cylinder 50 are supported by a compressor housing or crankcase 12 and are each driven by a crankshaft assembly 60 disposed within the compressor housing 12 and rotationally supported by the compressor housing 12. The foregoing components of the air compressor 10 are described in detail herein. The air compressor 10 may have a pentagonal-shaped cross-section. A support member 13 is fastened to a bottom surface of the air compressor 10. The support member 13 is used to mount the air compressor 10 on a locomotive or rail vehicle.

The first piston cylinder 20, the second piston cylinder 30, the third piston cylinder 40, and the fourth piston cylinder 50 are of substantially similar construction with the first piston cylinder 20 operating as the first cylinder, the second piston cylinder 30 operating as the second cylinder, the third piston cylinder 40 operating as the third cylinder, and the fourth piston cylinder 50 operating as the fourth cylinder in the multi-cylinder air compressor 10. In one aspect of the disclosure, the first piston cylinder 20 and the fourth piston cylinder 50 are high pressure piston cylinders. In this same aspect, the second piston cylinder 30 and the third piston cylinder 40 are low pressure piston cylinders. The first piston cylinder 20 and the fourth piston cylinder 50 are generally smaller than and generally have a smaller diameter than the second piston cylinder 30 and the third piston cylinder 40.

Figure 5:
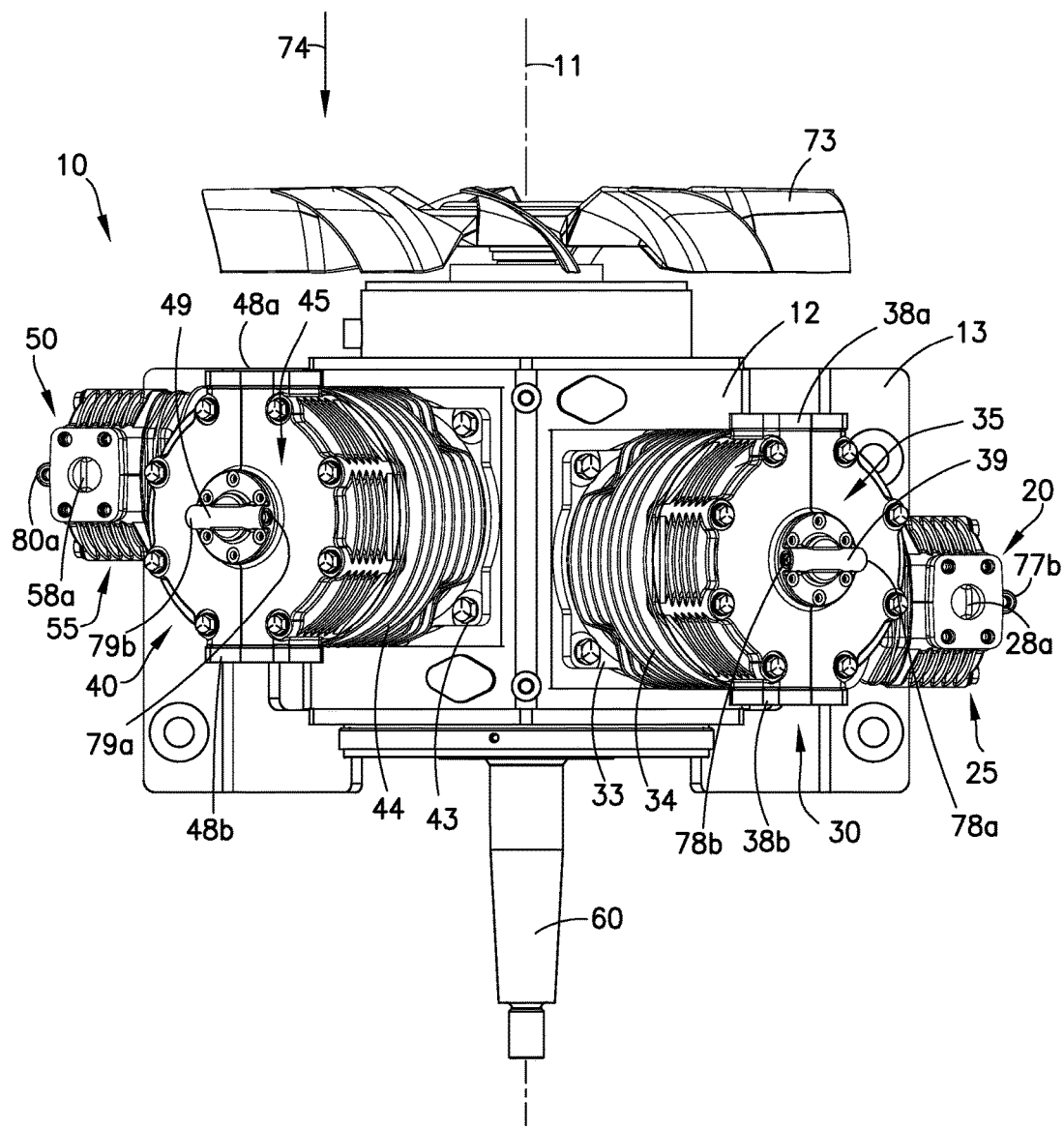
FIG. 5 is a top view of the radially configured air compressor of FIG. 1.
Figure 6:
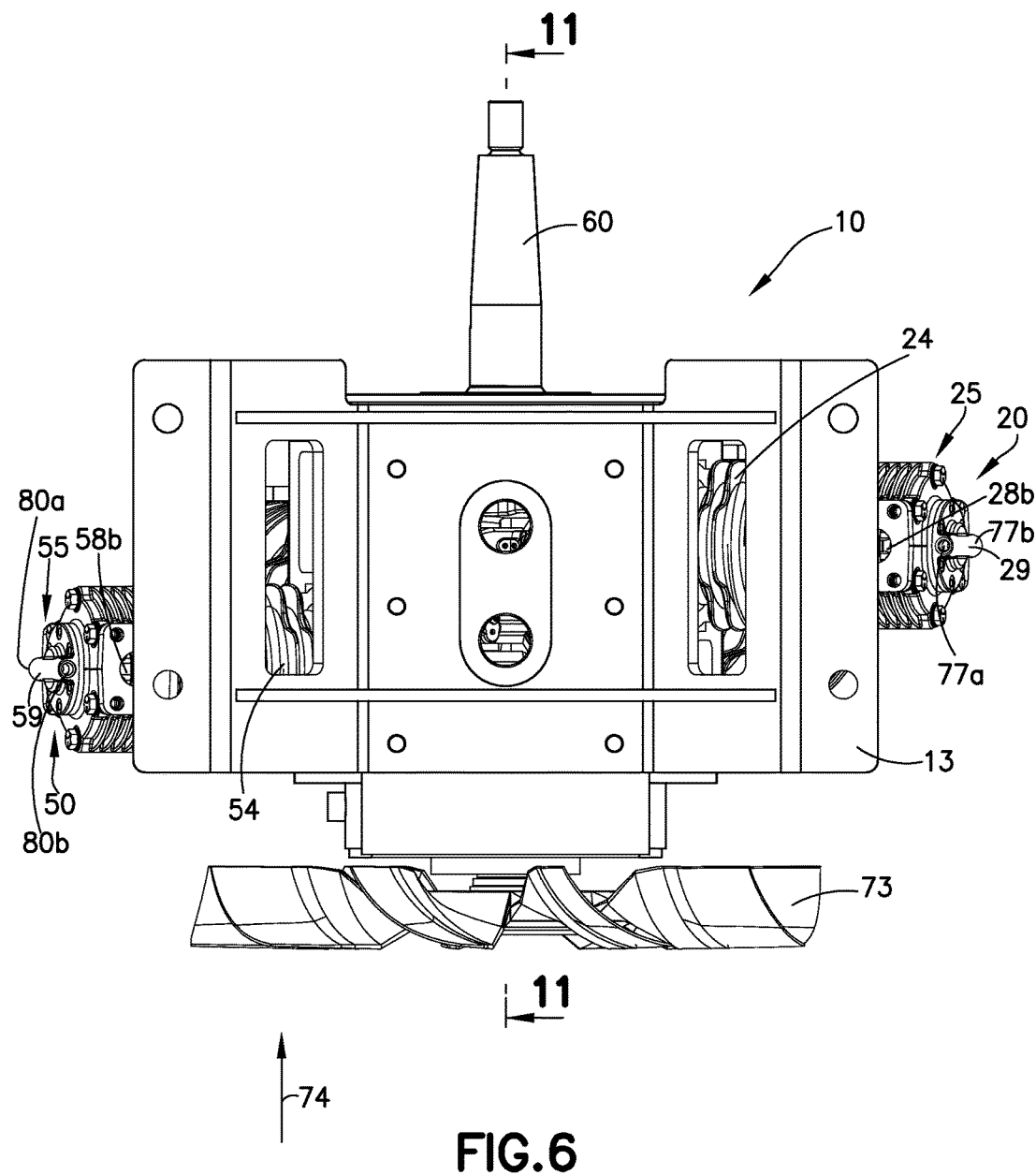
FIG. 6 is a bottom view of the radially configured air compressor of FIG. 1.
Figure 7:
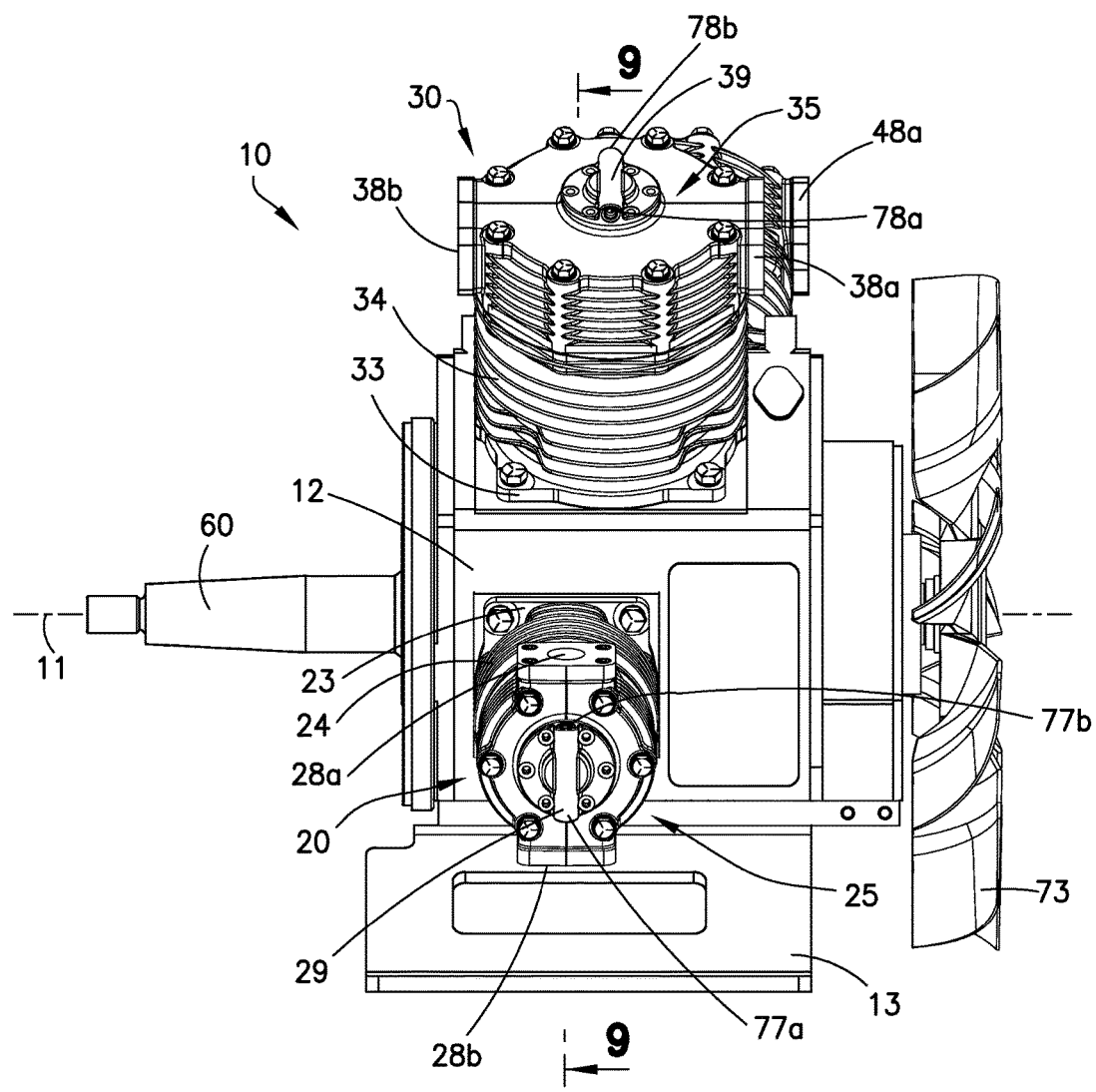
FIGS. 7 and 8 are side views of the radially configured air compressor of FIG. 1.
Figure 8:
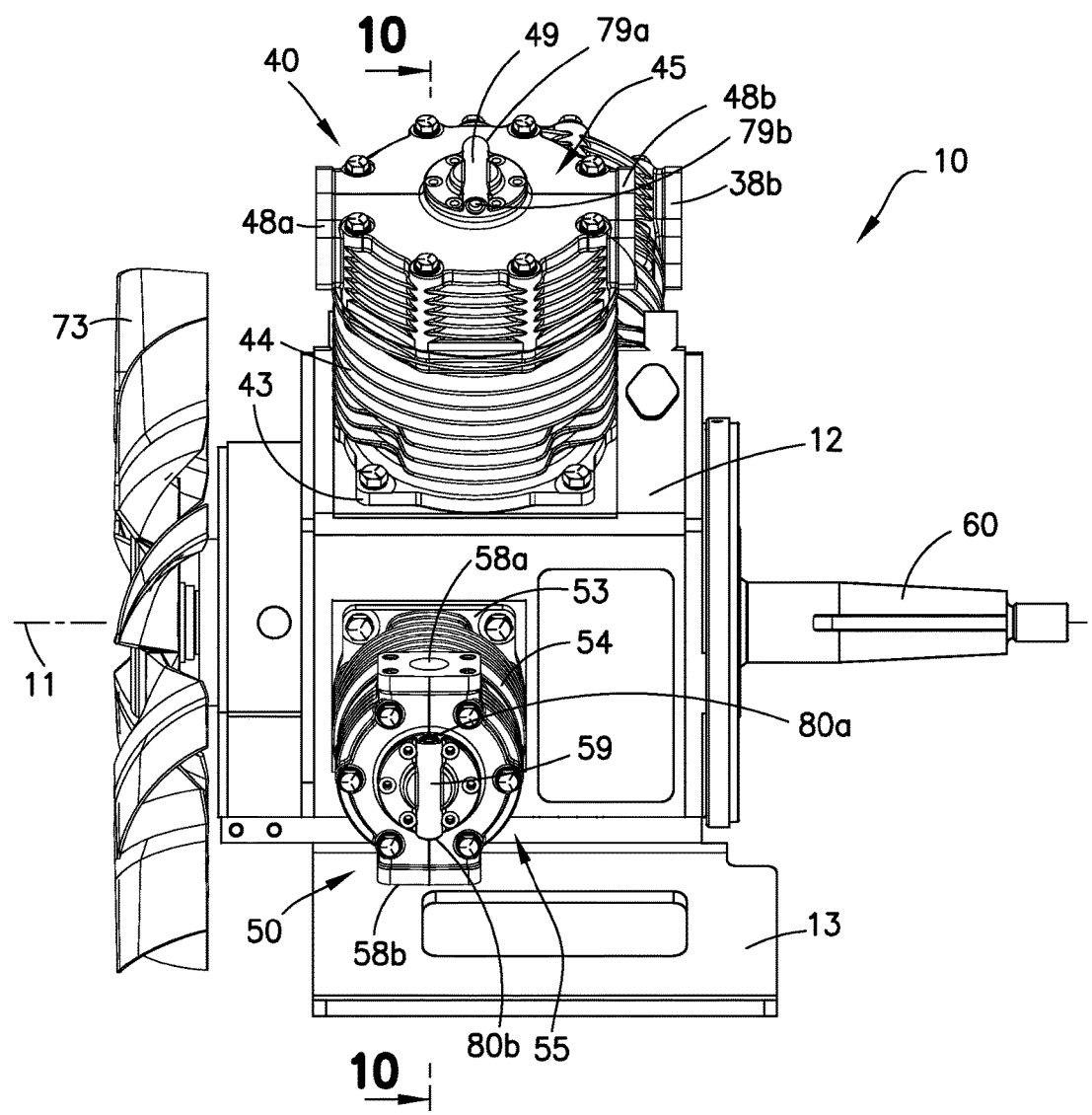

In one aspect, the first piston cylinder 20, the second piston cylinder 30, the third piston cylinder 40, and the fourth piston cylinder 50 are radially configured about a longitudinal axis 11 of the air compressor 10. The piston cylinders 20, 30, 40, 50 interface with an outer circumference of the air compressor 10. In one aspect, the piston cylinders 20, 30, 40, 50 are positioned in an X-shaped configuration around the outer circumference of the compressor housing. The first piston cylinder 20 and the fourth piston cylinder 50 may be configured as first and second lower legs of the X-shaped configuration. The second piston cylinder 30 and the third piston cylinder 40 may be configured as first and second upper legs of the X-shaped configuration. In one aspect, the second piston cylinder 30 and the third piston cylinder 40 are positioned on the compressor housing 12 between the first piston cylinder 20 and the fourth piston cylinder 50. As shown in FIG. 5, the first piston cylinder 20 and the fourth piston cylinder 50 may be offset on the compressor housing 12, so that the first piston cylinder 20 and the fourth piston cylinder 50 are not positioned along the same radial line. It is also possible that the first piston cylinder 20, the second piston cylinder 30, the third piston cylinder 40, and the fourth piston cylinder 50 would be aligned along a straight line around the outer circumference of the compressor housing 12.

Figure 3:
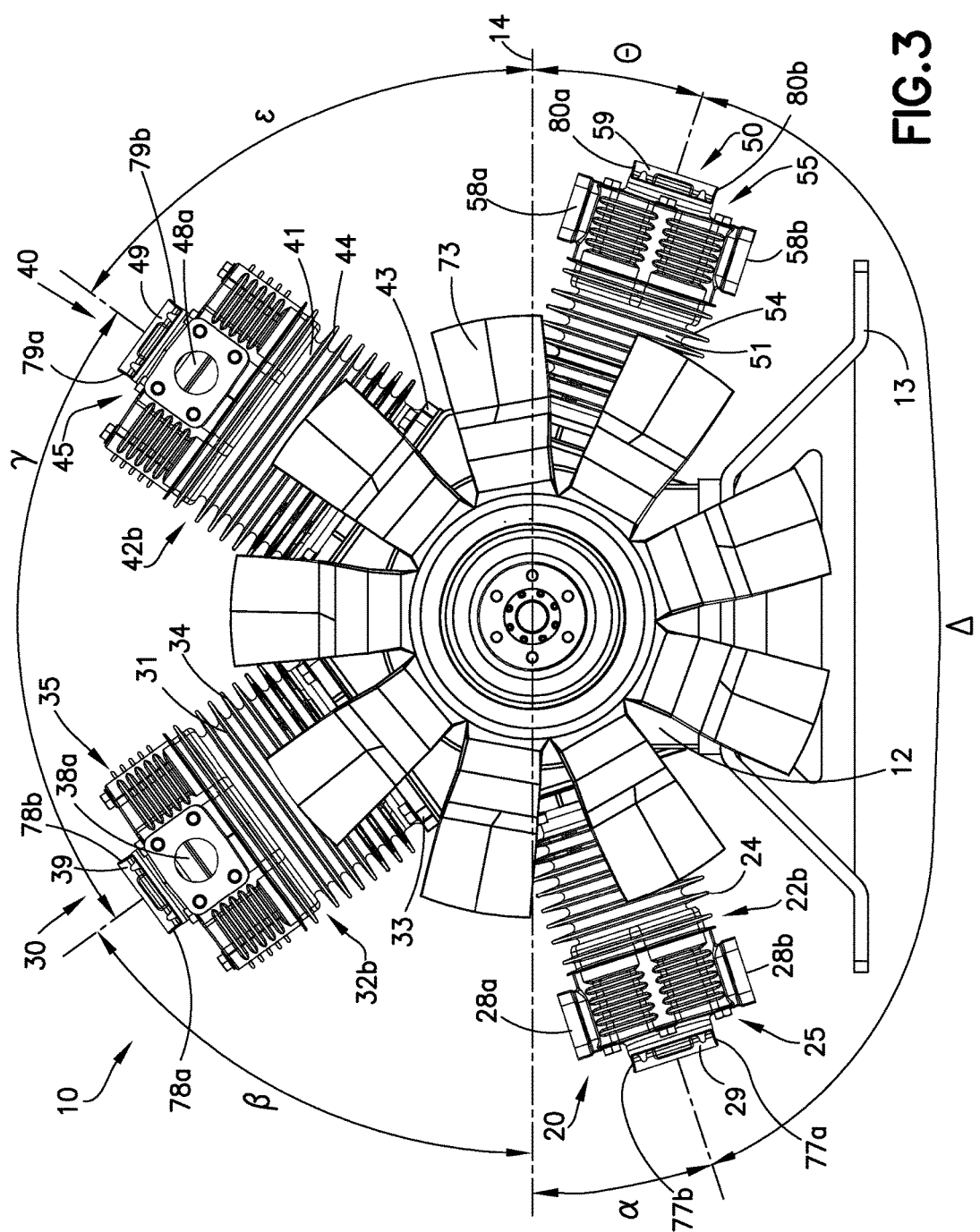
FIG. 3 is a front view of the radially configured air compressor of FIG. 1.
Figure 4:
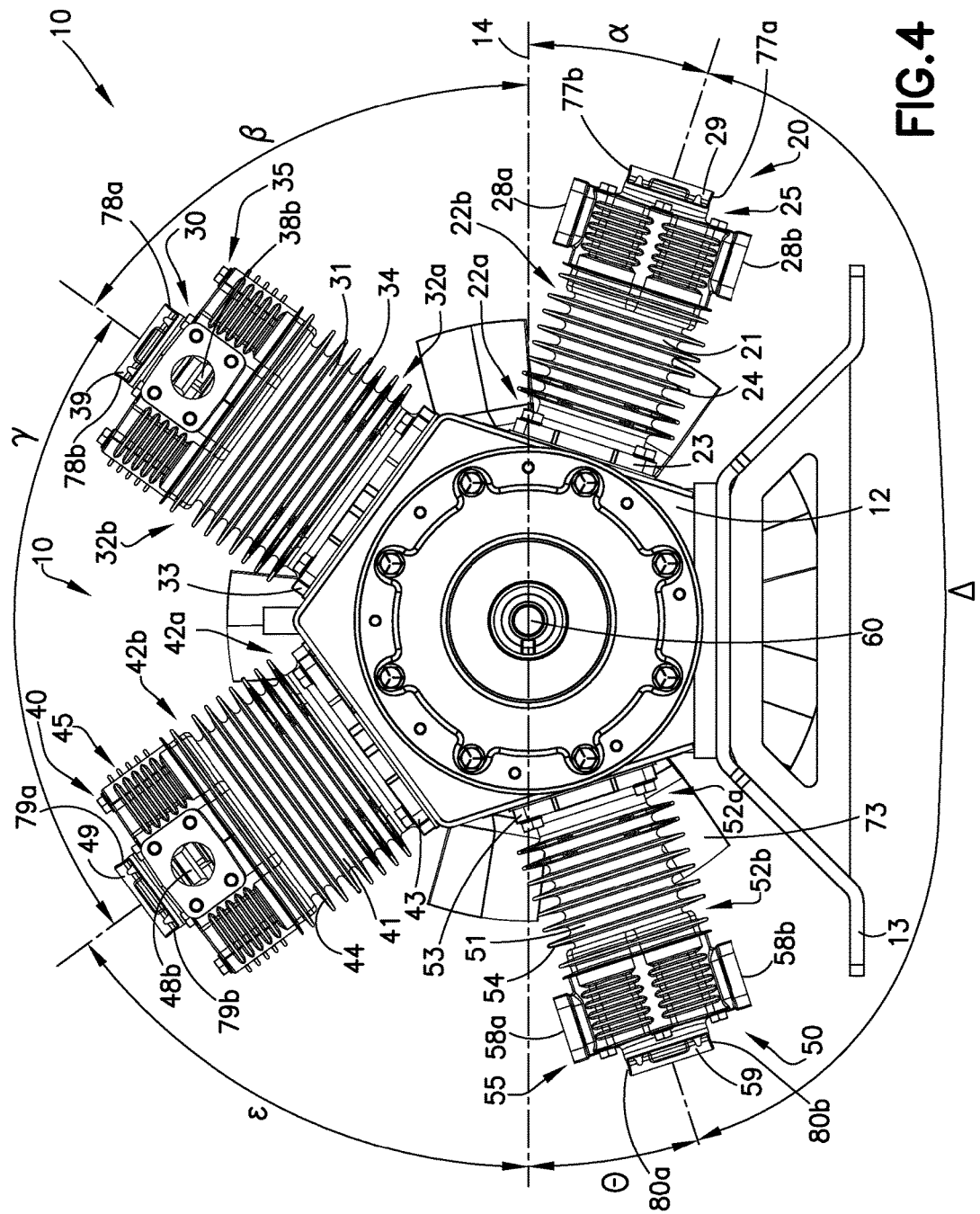
FIG. 4 is a rear view of the radially configured air compressor of FIG. 1.

As shown in FIGS. 3 and 4, the center of the first piston cylinder 20 is positioned at a first angle α from a horizontal 14 of the compressor housing 12. In one aspect, the first angle α is 18 degrees. The center of the second piston cylinder 30 is positioned at a second angle β from the horizontal 14 of the compressor housing 12. In one aspect, the second angle β is 54 degrees. In one aspect, the center of the first piston cylinder 20 is positioned 72 degrees apart from the center of the second piston cylinder 30. The center of the second piston cylinder 30 and the center of the third piston cylinder 40 are positioned at a third angle γ from one another. In one aspect, the third angle γ is 72 degrees. The center of the third piston cylinder 40 is positioned at a fourth angle ε from the horizontal 14 of the compressor housing 12. In one aspect, the fourth angle α is 54 degrees. The center of the fourth piston cylinder 50 is positioned at a fifth angle θ from the horizontal 14 of the compressor housing 12. In one aspect, the fifth angle θ is 18 degrees. In one aspect, the center of the third piston cylinder 40 is positioned 72 degrees apart from the center of the fourth piston cylinder 50. In another aspect, the first piston cylinder 20 and the fourth piston cylinder 50 are positioned 144 degrees apart from one another. A sixth angle Δ is defined between the first piston cylinder 20 and the fourth piston cylinder 50. In one aspect, the sixth angle Δ is 144 degrees. In one aspect, the combination of the first angle α and the second angle β, the third angle γ, and the combination of the fourth angle ε and the fifth angle θ are equal to one another. In this aspect, these angles are equal to 72 degrees. It is to be understood, however, that one of ordinary skill in the art would understand that additional aspects using different combinations of angles are also contemplated.

Referring to FIGS. 3 and 4, in one aspect, the sixth angle Δ is greater than the third angle γ. In other words, the distance between the first piston cylinder 20 and the fourth piston cylinder 50 is greater than the distance between the second piston cylinder 30 and the third piston cylinder 40. In one aspect, the X-shaped configuration of the piston cylinders 20, 30, 40, 50 is non-symmetrical about the horizontal plane 14 passing through the longitudinal axis 11 of the crankshaft assembly 60. The X-shaped configuration of the piston cylinders 20, 30, 40, 50 may be symmetrical about a vertical plane passing through the longitudinal axis 11 of the crankshaft assembly 60. The first piston cylinder 20 and the fourth piston cylinder 50 may be positioned below the horizontal plane 14 passing through the longitudinal axis 11 of the crankshaft assembly 60. In one aspect, the sixth angle Δ is less than the combination of the first angle α, the second angle β, the third angle γ, the fourth angle ε, and the fifth angle θ.

The positioning of the first piston cylinder 20, the second piston cylinder 30, the third piston cylinder 40, and the fourth piston cylinder 50 creates a reduction in the torque pulse of the air compressor 10 due to the gas forces generated during the compression stroke of each piston cylinder. A peak gas force occurs in a compressor cylinder as the piston approaches the top dead center within the cylinder. The gas force transmits a torque pulse through the crankshaft assembly 60, which is variable throughout the rotation of the crankshaft assembly 60. The crankshaft assembly 60 can experience different torque pulses at different locations based on the peak gas force created by each cylinder. Depending on the design, the torque pulse may change direction throughout a single rotation of the crankshaft assembly 60. This means that the torque pulse may change from a positive torque to a negative torque throughout a single rotation of the crankshaft assembly. This type of torque reversal is a common trait of reciprocating machines of any type. In multi-cylinder air compressors, the instantaneous torque of each piston is summed to create an overall torque curve for the compressor. Preexisting air compressors can experience an overall torque pulse that fluctuates between a high torque pulse value to a low torque pulse value. However, to reduce the amount of torsional force experienced by the crankshaft assembly 60, it is desirable to have an air compressor with a consistent overall torque pulse. By positioning the first piston cylinder 20, the second piston cylinder 30, the third piston cylinder 40, and the fourth piston cylinder 50 on the compressor housing 12 as described hereinabove, a more consistent overall torque pulse is achieved. Additionally, by using this configuration, the torque pulse of the air compressor 10 does not reverse directions throughout the rotation of the crankshaft assembly 60. This also helps to reduce the torsional force applied to the crankshaft assembly 60. The combination of the lack of reversal in the torque pulse and a reduced overall torque pulse results in an air compressor 10 that is easier on the driveline, which is especially advantageous in applications where the air compressor 10 is driven by an electric motor. Further, by positioning the second piston cylinder 30 and the third piston cylinder 40, which are low pressure cylinders, between the first piston cylinder 20 and the fourth piston cylinder 50, the torque pulse is further reduced. An air compressor 10 with two high pressure piston cylinders positioned between two low pressure piston cylinders would experience a higher torque pulse.

An additional improvement over preexisting air compressors is achieved by positioning the piston cylinders nearly 180 degrees out of phase. The dynamic balance of the air compressor 10 is improved as compared to preexisting air compressors. Therefore, the air compressor 10 experiences fewer off-balance forces that may affect the operation of the air compressor 10.

Figure 9:
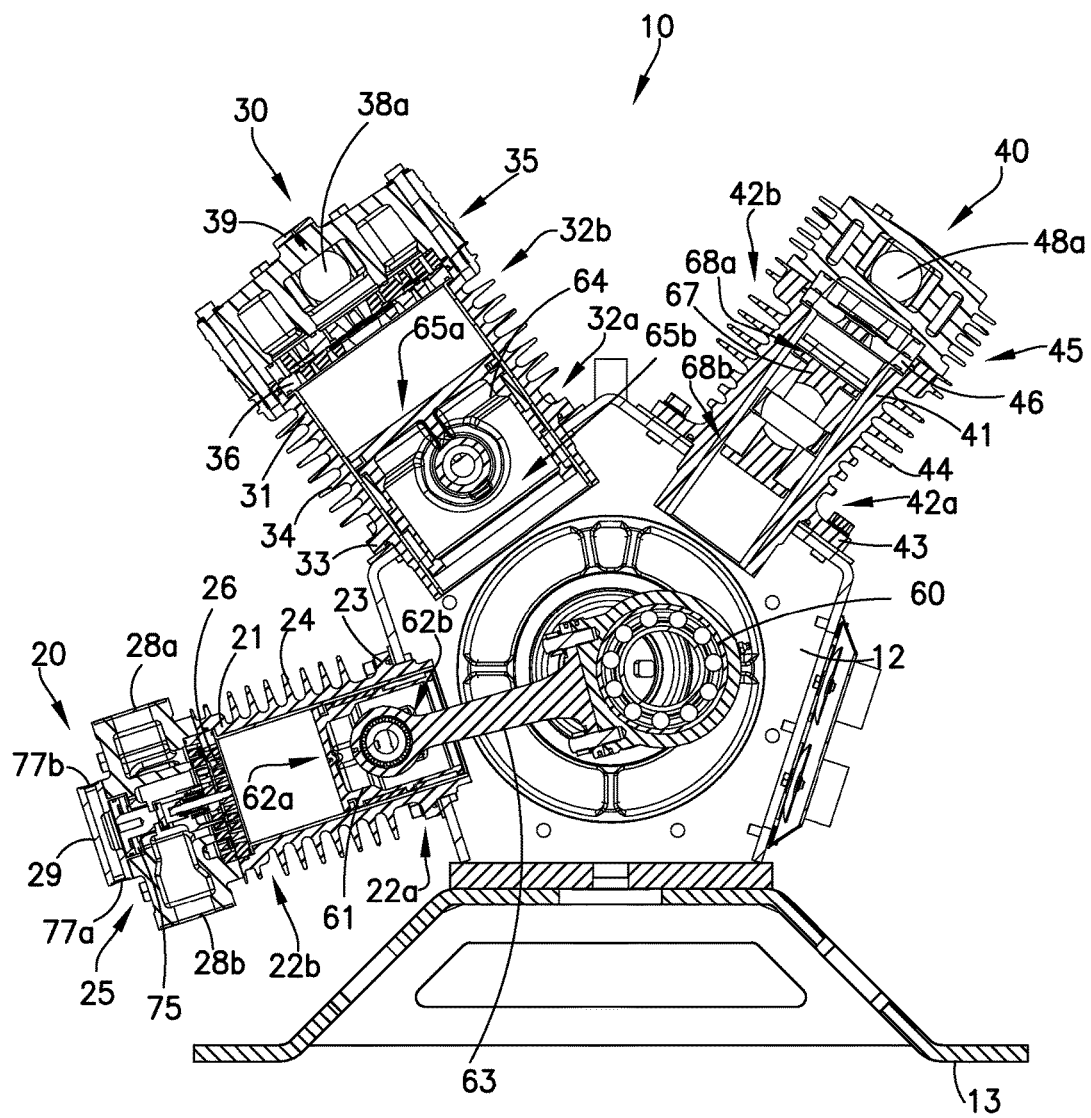
FIG. 9 is a cross-sectional view of the radially configured air compressor of FIG. 1 along line 9-9 in FIG. 7.
Figure 10:
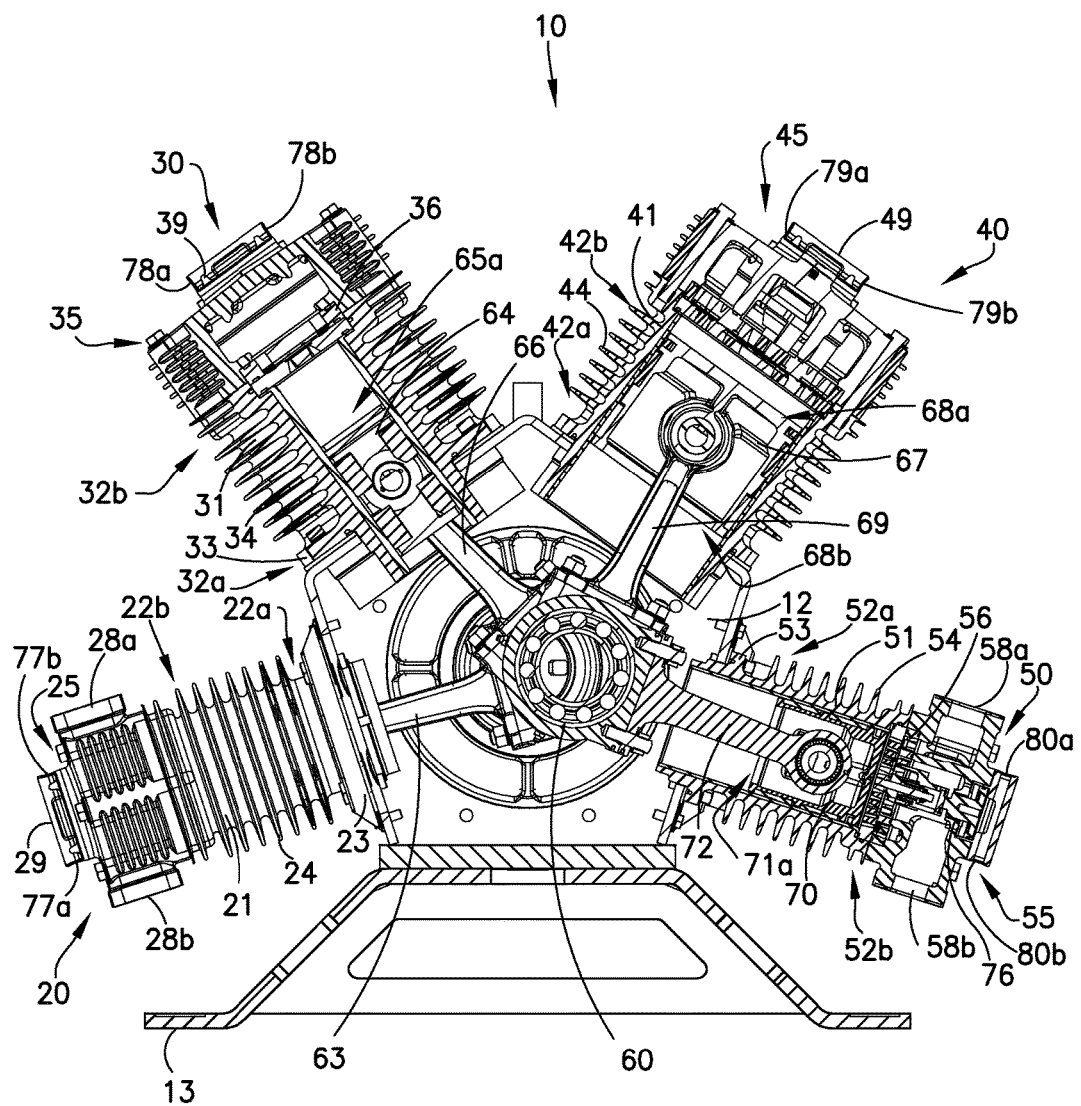
FIG. 10 is a cross-sectional view of the radially configured air compressor of FIG. 1 along line 10-10 in FIG. 8.
Figure 11:
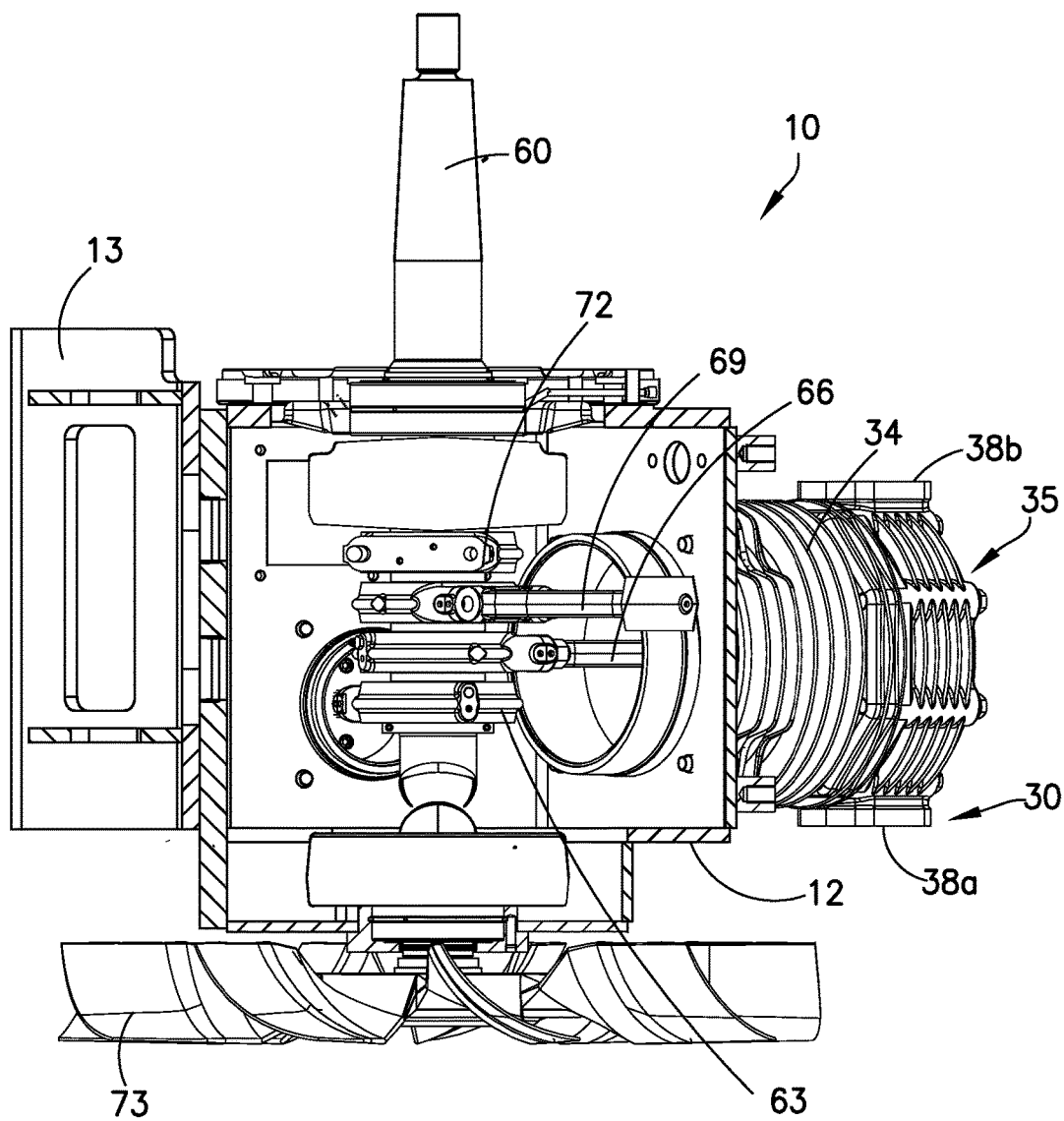
FIG. 11 is a cross-sectional view of the radially configured air compressor of FIG. 1 along line 11-11 in FIG. 6.

As shown in FIGS. 9-11, the first piston cylinder 20 includes a cylindrical housing 21 that has a first end 22a adapted to be inserted into a corresponding opening, as described herein, in the compressor housing 12, and a second end 22b. The cylindrical housing 21 is formed with a flange 23 located proximal of the first end 22a for interfacing with the exterior of the compressor housing 12. Heat-dissipating fins 24 may be provided about the cylindrical housing 21, and the cylindrical housing 21 may be formed of any suitable material providing sufficient strength and heat-dissipating characteristics such as aluminum.

A cylinder head 25 is secured to the second end 22b of the cylindrical housing 21. The cylinder head 25 secures a valve assembly 26 on the second end 22b of the cylindrical housing 21 via mechanical fasteners. The cylinder head 25 also houses an unloader cap 29 positioned above the valve assembly 26. The unloader cap 29 houses an unloader piston 75 that is pneumatically operated by air piloted through the unloader cap 29 mechanically fastened to the top of the cylinder head 25. A lubrication free seal between the unloader piston 75 and the unloader cap 29 separates the process pressurized air within the inlet portion of the cylinder head 25 from the pressurized air (pilot air) within the unloader system. The unloader piston 75 functions to hold the inlet side of the valve assembly 26 open when air pressure is applied to pilot ports 77a, 77b of the unloader cap 29. During this period of operation, the compressor 10 can rotate without delivering compressed air to the compressor discharge. The cylinder head 25 includes a first air channel 28a and a second air channel 28b. The cylinder head 25 may be formed of any suitable material providing sufficient strength and heat transfer characteristics such as aluminum.

As noted previously, the second piston cylinder 30 has a substantially similar construction as the rest of the piston cylinders, as now described hereinafter. The second piston cylinder 30 includes a cylindrical housing 31 that has a first end 32a adapted to be inserted into a corresponding opening, as described herein, in the compressor housing 12, and a second end 32b. The cylindrical housing 31 is formed with a flange 33 located proximal of the first end 32a for interfacing with the exterior of the compressor housing 12. Heat-dissipating fins 34 may be provided about the cylindrical housing 31, and the cylindrical housing 31 may be formed of any suitable material providing sufficient strength and heat-dissipating characteristics such as aluminum.

A cylinder head 35 is secured to the second end 32b of the cylindrical housing 31. The cylinder head 35 secures a valve assembly 36 on the second end 32b of the cylindrical housing 31 via mechanical fasteners. The cylinder head 35 also houses an unloader cap 39 positioned above the valve assembly 36. The unloader cap 39 houses an unloader piston that is pneumatically operated by air piloted through the unloader cap 39 mechanically fastened to the top of the cylinder head 35. A lubrication free seal between the unloader piston and the unloader cap 39 separates the process pressurized air within the inlet portion of the cylinder head 35 from the pressurized air (pilot air) within the unloader system. The unloader piston functions to hold the inlet side of the valve assembly 36 open when air pressure is applied to pilot ports 78a, 78b of the unloader cap 39. During this period of operation, the compressor 10 can rotate without delivering compressed air to the compressor discharge. The cylinder head 35 includes a first air channel 38a and a second air channel 38b. The cylinder head 35 may be formed of any suitable material providing sufficient strength and heat transfer characteristics such as aluminum.

As noted previously, the third piston cylinder 40 has a substantially similar construction as the rest of the piston cylinders, as now described hereinafter. The third piston cylinder 40 includes a cylindrical housing 41 that has a first end 42a adapted to be inserted into a corresponding opening, as described herein, in the compressor housing 12, and a second end 42b. The cylindrical housing 41 is formed with a flange 43 located proximal of the first end 42a for interfacing with the exterior of the compressor housing 12. Heat-dissipating fins 44 may be provided about the cylindrical housing 41, and the cylindrical housing 41 may be formed of any suitable material providing sufficient strength and heat-dissipating characteristics such as aluminum.

A cylinder head 45 is secured to the second end 42b of the cylindrical housing 41. The cylinder head 45 secures a valve assembly 46 on the second end 42b of the cylindrical housing 41 via mechanical fasteners. The cylinder head 45 also houses an unloader cap 49 positioned above the valve assembly 46. The unloader cap 49 houses an unloader piston that is pneumatically operated by air piloted through the unloader cap 49 mechanically fastened to the top of the cylinder head 49. A lubrication free seal between the unloader piston and unloader cap 49 separates the process pressurized air within the inlet portion of the cylinder head 45 from the pressurized air (pilot air) within the unloader system. The unloader piston functions to hold the inlet side of the valve assembly 46 open when air pressure is applied to pilot ports 79a, 79b of the unloader cap 49. During this period of operation, the compressor 10 can rotate without delivering compressed air to the compressor discharge. The cylinder head 45 includes a first air channel 48a and a second air channel 48b. The cylinder head 45 may be formed of any suitable material providing sufficient strength and heat transfer characteristics such as aluminum.

As noted previously, the fourth piston cylinder 50 has a substantially similar construction as the rest of the piston cylinders, as now described hereinafter. The fourth piston cylinder 50 includes a cylindrical housing 51 that has a first end 52a adapted to be inserted into a corresponding opening, as described herein, in the compressor housing 12, and a second end 52b. The cylindrical housing 51 is formed with a flange 53 located proximal of the first end 52a for interfacing with the exterior of the compressor housing 12. Heat-dissipating fins 54 may be provided about the cylindrical housing 51, and the cylindrical housing 51 may be formed of any suitable material providing sufficient strength and heat-dissipating characteristics such as aluminum.

A cylinder head 55 is secured to the second end 52b of the cylindrical housing 51. The cylinder head 55 secures a valve assembly 56 on the second end 52b of the cylindrical housing 51 via mechanical fasteners. The cylinder head 55 also houses an unloader cap 59 positioned above the valve assembly 56. The unloader cap 59 houses an unloader piston 78 that is pneumatically operated by air piloted through the unloader cap 59 mechanically fastened to the top of the cylinder head 55. A lubrication free seal between the unloader piston 78 and the unloader cap 59 separates the process pressurized air within the inlet portion of the cylinder head 55 from the pressurized air (pilot air) within the unloader system. The unloader piston 78 functions to hold the inlet side of the valve assembly 56 open when air pressure is applied to pilot ports 80a, 80b of the unloader cap 59. During this period of operation, the compressor 10 can rotate without delivering compressed air to the compressor discharge. The cylinder head 55 includes a first air channel 58a and a second air channel 58b. The cylinder head 55 may be formed of any suitable material providing sufficient strength and heat transfer characteristics such as aluminum.

Referring to FIGS. 9-11, the first piston cylinder 20 further includes a first piston 61 that is reciprocally operable within the cylindrical housing 21. The piston 61 includes a first end 62a and a second end 62b, and is made of any suitable material providing sufficient strength and heat transfer characteristics such as aluminum. The piston 61 is operatively connected to the crankshaft assembly 60 via a connecting rod 63. In operation, the piston 61 operates in a reciprocating movement which is generated via rotation of the crankshaft assembly 60. Air is drawn into the cylindrical housing 21 of the first piston cylinder 20 via one of the air channels 28a, 28b as a result of the downward movement of the piston 61. A valve assembly 26 includes a portion that is opened during the downward movement of the piston 61, drawing air into the cylindrical housing 21, and closes during the upward movement. Further, the valve assembly has another portion that closes during the downward movement of the piston 61 and opens during the upward movement of the piston 61, whereby air in the cylindrical housing 21 is compressed and is guided out of the cylindrical housing 21 via one of the air channels 28a, 28b.

The second piston cylinder 30 further includes a second piston 64 that is reciprocally operable within the cylindrical housing 31. The piston 61 includes a first end 65a and a second end 65b, and is made of any suitable material providing sufficient strength and heat transfer characteristics such as aluminum. The piston 64 is operatively connected to the crankshaft assembly 60 via a connecting rod 66. In operation, the piston 64 operates in a reciprocating movement which is generated via rotation of the crankshaft assembly 60. Air is drawn into the cylindrical housing 31 of the second piston cylinder 30 via one of the air channels 38a, 38b as a result of the downward movement of the piston 64. A valve assembly 36 includes a portion that is opened during the downward movement of the piston 64, drawing air into the cylindrical housing 31, and closes during the upward movement. Further, the valve assembly has another portion that closes during the downward movement of the piston 64 and opens during the upward movement of the piston 64, whereby air in the cylindrical housing 31 is compressed and is guided out of the cylindrical housing 31 via one of the air channels 38a, 38b.

The third piston cylinder 40 further includes a third piston 67 that is reciprocally operable within the cylindrical housing 41. The piston 67 includes a first end 68a and a second end 68b, and is made of any suitable material providing sufficient strength and heat transfer characteristics such as aluminum. The piston 67 is operatively connected to the crankshaft assembly 60 via a connecting rod 69. In operation, the piston 67 operates in a reciprocating movement which is generated via rotation of the crankshaft assembly 60. Air is drawn into the cylindrical housing 41 of the third piston cylinder 40 via one of the air channels 48a, 48b as a result of the downward movement of the piston 67. A valve assembly 46 includes a portion that is opened during the downward movement of the piston 67, drawing air into the cylindrical housing 41, and closes during the upward movement. Further, the valve assembly has another portion that closes during the downward movement of the piston 67 and opens during the upward movement of the piston 67, whereby air in the cylindrical housing 41 is compressed and is guided out of the cylindrical housing 41 via one of the air channels 48a, 48b.

The fourth piston cylinder 50 further includes a fourth piston 70 that is reciprocally operable within the cylindrical housing 51. The piston 70 includes a first end 71a and a second end 71b, and is made of any suitable material providing sufficient strength and heat transfer characteristics such as aluminum. The piston 70 is operatively connected to the crankshaft assembly 60 via a connecting rod 72. In operation, the piston 70 operates in a reciprocating movement which is generated via rotation of the crankshaft assembly 60. Air is drawn into the cylindrical housing 51 of the fourth piston cylinder 50 via one of the air channels 58a, 58b as a result of the downward movement of the piston 70. A valve assembly 56 includes a portion that is opened during the downward movement of the piston 70, drawing air into the cylindrical housing 51, and closes during the upward movement. Further, the valve assembly has another portion that closes during the downward movement of the piston 70 and opens during the upward movement of the piston 70, whereby air in the cylindrical housing 51 is compressed and is guided out of the cylindrical housing 51 via one of the air channels 58a, 58b.

The air compressor 10 experiences improved compressor housing 12 ventilation due to the increased displacement of compressor housing 12 volume without compromising the added benefits of improved torque pulse and dynamic balance for the air compressor 10. In one aspect, the compressor housing 12 displaces an amount of air that is approximately 72% of the swept volume of the air compressor 10 during every rotation of the crankshaft assembly 60. This creates an effective cooling of the air compressor 10 by forcing fresh air in and out of the air compressor 10 for the purpose of cooling the internal components of the air compressor 10 during operation. Some of the preexisting air compressors that are designed to reduce torque pulse and minimize inertial vibrations have a much less favorable compressor housing 12 displacement to swept volume ratio, which means that the amount of cooling air available to the internal components is reduced. It may even be reduced to the point where this type of cooling is not effective for reliable air compressor operation. Other preexisting air compressors also sacrifice torque pulse and balance control in favor of a larger internal displacement. By using the configuration of the present air compressor 10, there is no need to use compressor inlet air to cool the compressor housing 10. This type of cooling configuration used with preexisting air compressors reduces compressor efficiency, increases operating air temperatures, and can cause the compressor housing 12 temperature to increase during unloaded operation.

The air compressor 10 further includes a cooling fan 73. The cooling fan 73 is operatively connected to the crankshaft assembly 60 of the air compressor 10. The rotation of the crankshaft assembly 60 rotates the cooling fan 73 which creates a flow path 74 that extends perpendicular to the first piston cylinder 20, the second piston cylinder 30, the third piston cylinder 40, and the fourth piston cylinder 50. The cooling fan 73 provides cooling ventilation to the piston cylinders. In one aspect, the perpendicular flow path 74 created by the cooling fan 73 provides ventilation to each of the piston cylinders because the first piston cylinder 20, the second piston cylinder 30, the third piston cylinder 40, and the fourth piston cylinder 50 are each positioned behind the cooling fan 73 in the perpendicular flow path 74. The radial arrangement of the piston cylinders allows for cooling from the cooling fan 73 to directly flow over each piston cylinder. This is an improvement over preexisting air compressors that include horizontally opposed piston cylinders, wherein a flow path of a cooling fan that extends across the piston cylinders is partially or completely blocked from cooling piston cylinders positioned in, the back of the air compressor. When the piston cylinders of an air compressor are positioned behind one another, the cooling flow path of the cooling fan does not reach each of the piston cylinders. The air compressor 10 of the air compressor solves this problem. The radial configuration of the first piston cylinder 20, the second piston cylinder 30, the third piston cylinder 40, and the fourth piston cylinder 50 also allows for a greater portion of each piston cylinder to be located within the flow path 74 of the cooling fan 73. It is also contemplated that the cooling fan 73 may be clutch-operated to optimize the cooling of the air compressor 10.

By using the configuration of the air compressor 10 described hereinabove, the overall dimensions are reduced as compared to preexisting air compressors. Without the piston cylinders positioned side by side in the longitudinal direction along the compressor housing 12, the longitudinal length of the air compressor 10 is reduced as compared to preexisting air compressors. By banking the first piston cylinder 20 and the fourth piston cylinder 50 at 18 degrees from the horizontal 14 of the air compressor 10, the width of the air compressor 10 is smaller as compared to air compressors with horizontally positioned piston cylinders. Further, by positioning the first piston cylinder 20 and the fourth piston cylinder 50 at 18 degrees from the horizontal 14 of the air compressor 10, the height of the air compressor 10 is reduced as compared to preexisting air compressors, especially an air compressor with a "W" configuration for the piston cylinders.

With reference to FIGS. 12-17, the connecting rods 63, 66, 69, 72 are described in greater detail. Although the description is provided in relation to connecting rod 63, it is to be understood that the remaining connecting rods 66, 69, 72 are configured similarly to connecting rod 63. The connecting rod 63 includes a rod member 100, a crank pin receiving end 102 provided on one end of the rod member 100, and a wrist pin receiving end 104 provided on an opposing end of the rod member 100. The rod member 100 may be substantially rectangular and extends between the crank pin receiving end 102 and the wrist pin receiving end 104. The crank pin receiving end 102 and the wrist pin receiving end 104 are substantially circular and define a crank pin receiving bore 106 and a wrist pin receiving bore 108, respectively. Once assembled, the crank pin of the crankshaft assembly 60 is inserted through the crank pin receiving bore 106 and the wrist pin of the first piston assembly 61 is inserted through the wrist pin receiving bore 108 of the connecting rod 63.

Figure 14:
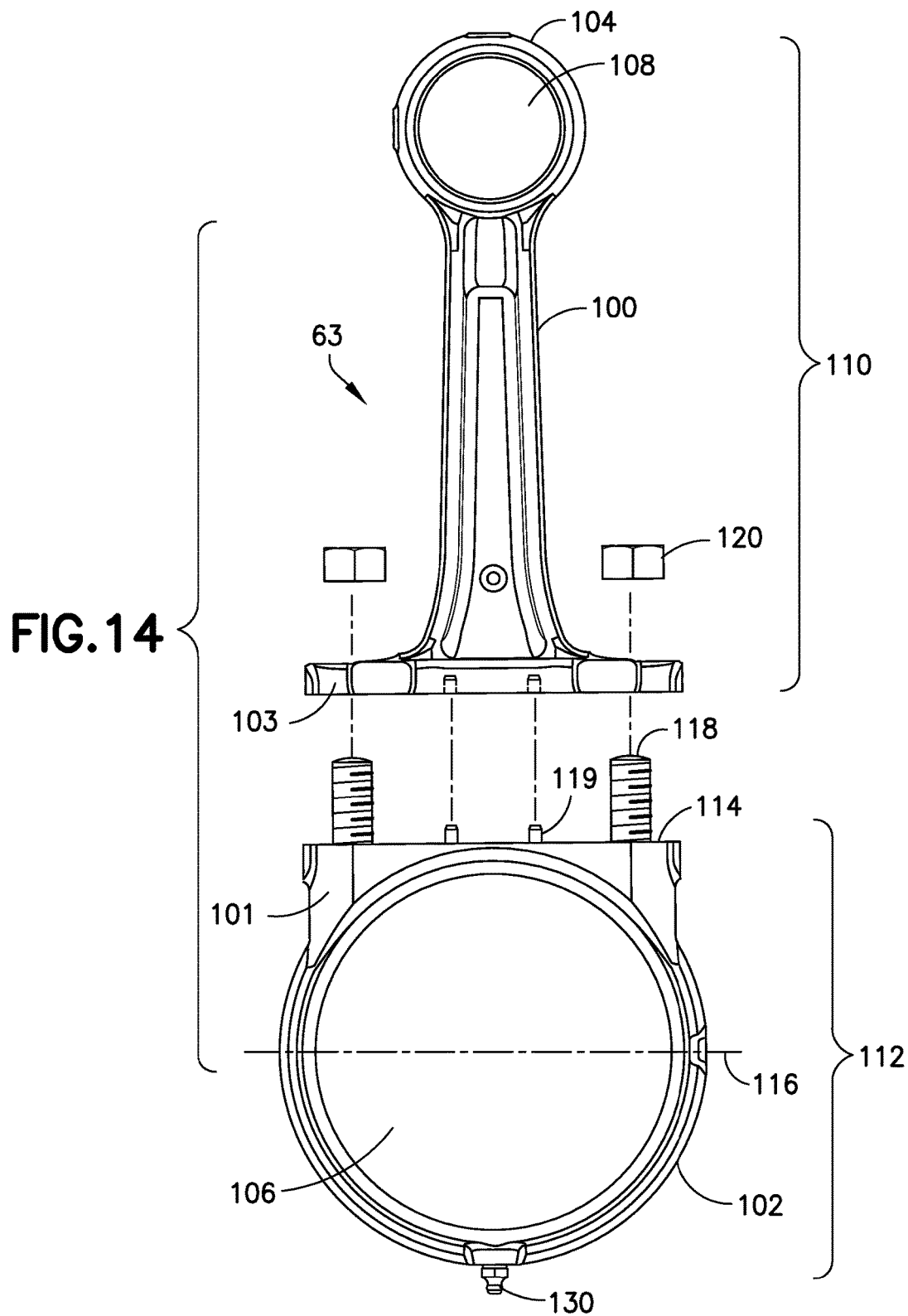
FIG. 14 is a top view of the connecting rod of FIG. 12 depicting the assembly of the connecting rod with the use of studs and locking nuts.
Figure 15:
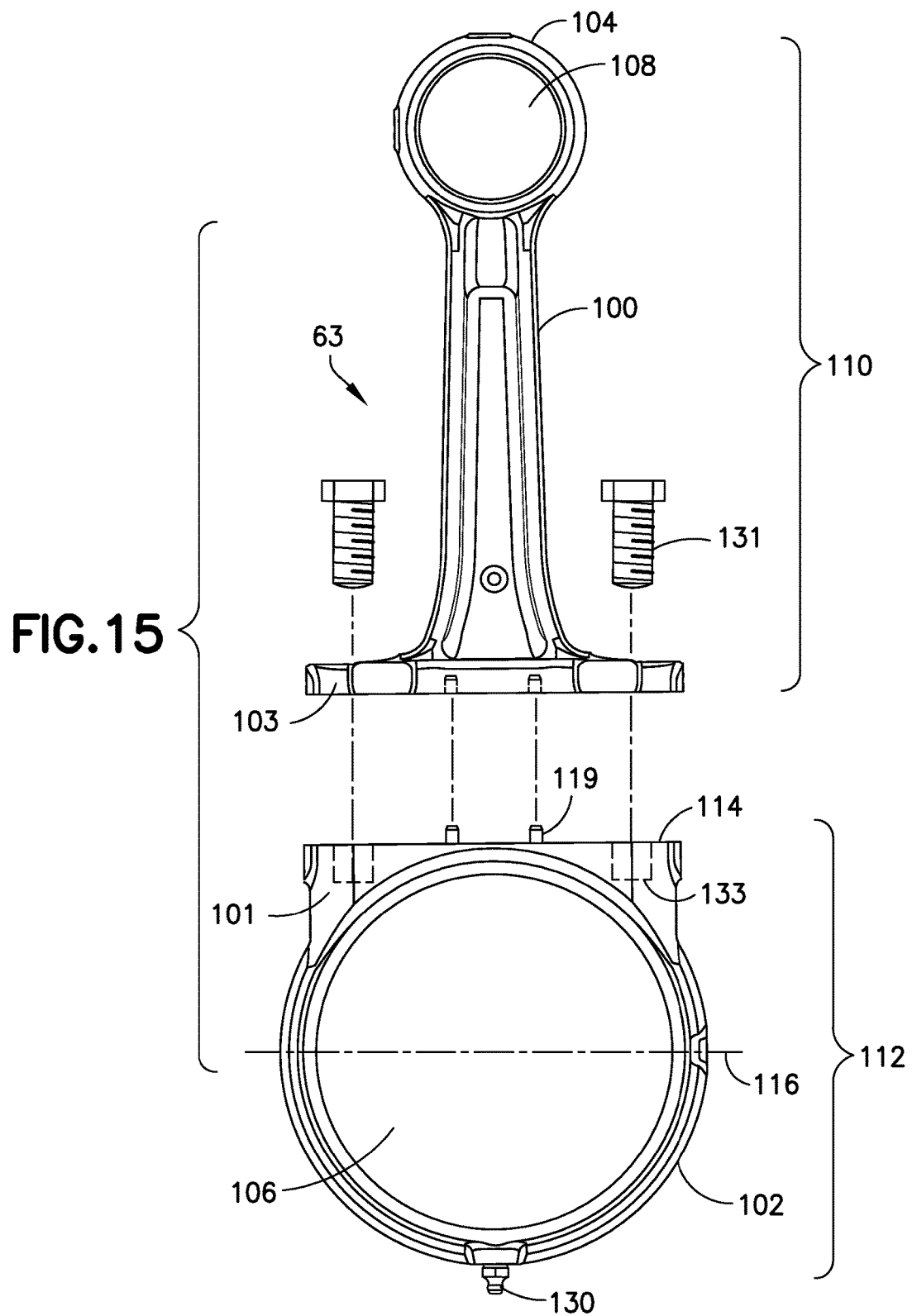
FIG. 15 is a top view of the connecting rod of FIG. 12 depicting the assembly of the connecting rod with the use of bolts.

The connecting rod 63 may be provided as two separate portions 110, 112. The first portion 110 may include the rod member 100 and the wrist pin receiving end 104. The second portion 112 may include the crank pin receiving end 102. The first portion 110 and the second portion 112 may be split at a separation line 114. The rod member 100 and the wrist pin receiving end 104 may be positioned above the separation line 114, and the crank pin receiving end 102 may be positioned below the separation line 114. The separation line 114 is positioned between the rod member 100 and the crank pin receiving end 102, which is provided at a position higher than where typical connecting rods are split. A first base portion 101 may extend from a top surface of the crank pin receiving end 102. A second base portion 103 may extend from a bottom surface of the rod member 100. The separation line 114 may be established between the first base portion 101 and the second based portion 103. At least two studs 118 may extend from the top surface of the second portion 112. The studs 118 may be received in corresponding apertures on the first portion 110. Locking nuts 120 may be threaded onto the ends of the studs 118 to lock the first portion 110 onto the second portion 112. It is also contemplated that the first portion 110 and the second portion 112 may be bolted together at the separation line 114. As shown in FIG. 15, a pair of bolts 131 may be provided to connect the two portions 110, 112. The bolts 131 may be threaded into apertures 133 defined in the second portion 112. As shown in FIG. 14, at least one locating pin 119 may be provided on an upper surface of the second portion 112. In one aspect, two locating pins 119 may be provided on the second portion 112. The locating pins 119 may be inserted into corresponding apertures defined in the first portion 110. The locating pins 119 assist in aligning the first portion 110 and the second portion 112 relative to one another to connect the two portions 110, 112 with the studs 118 and locking nuts 120.

Figure 12:
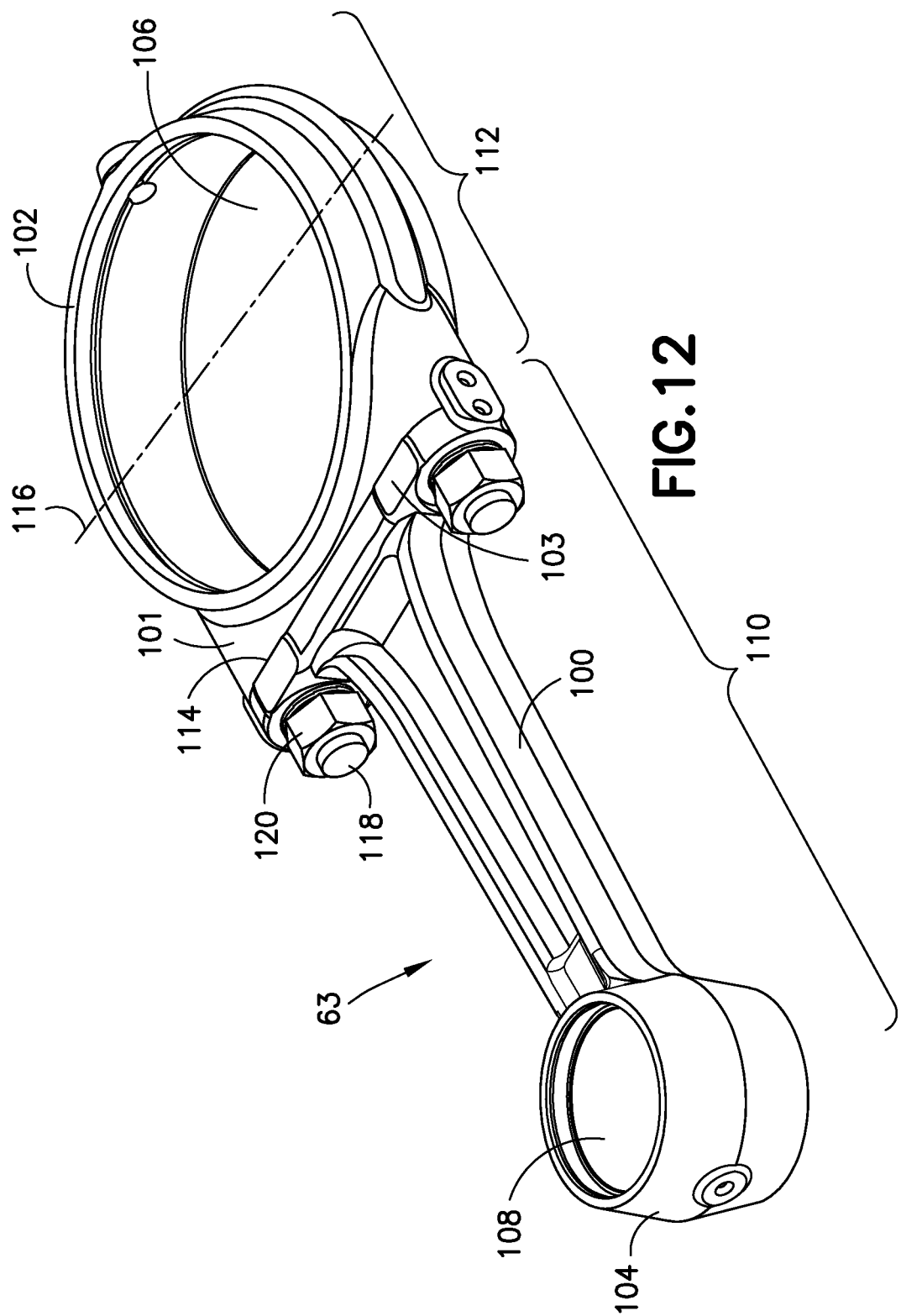
FIG. 12 is a front perspective view of a connecting rod in accordance with this disclosure.
Figure 13:
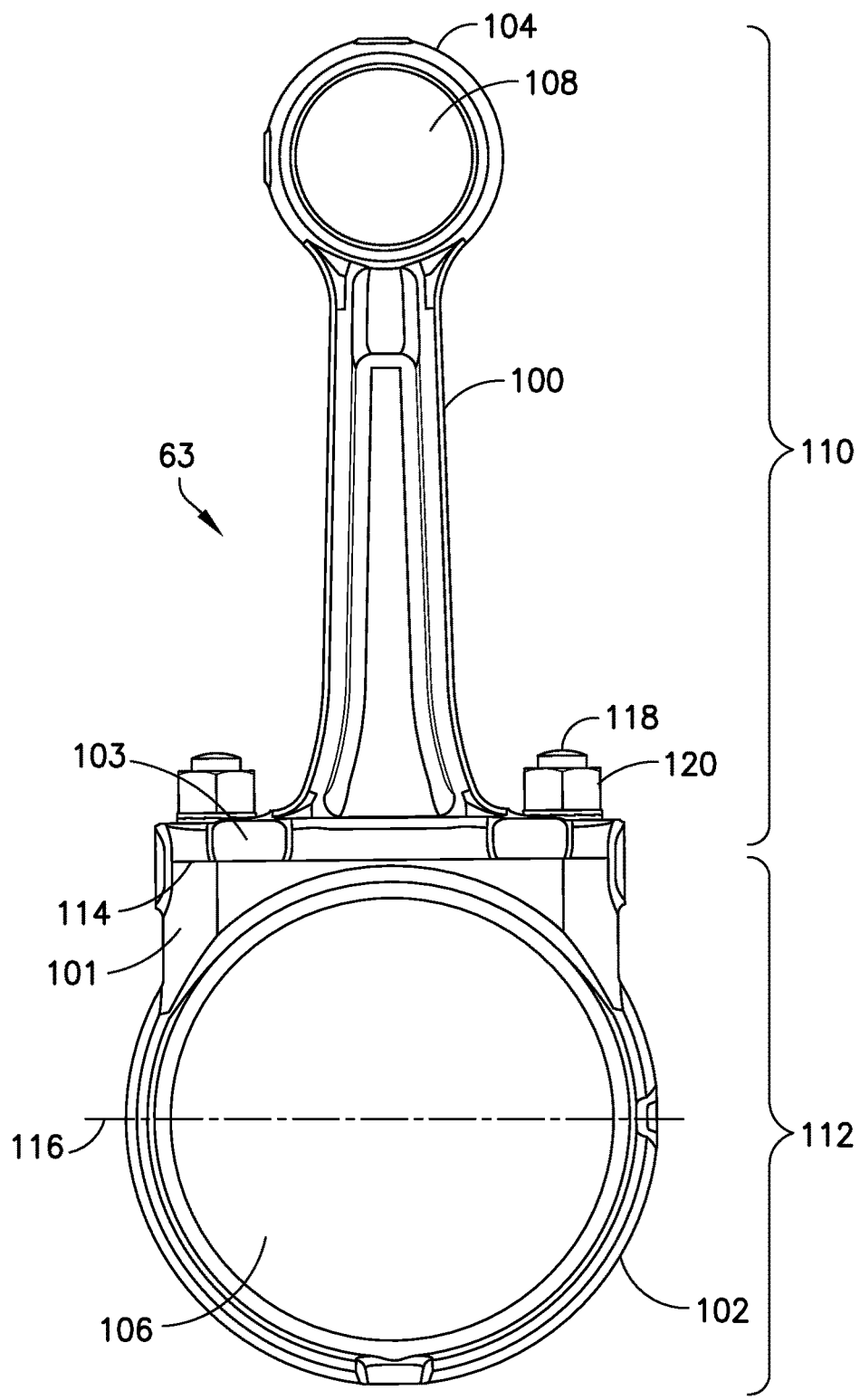
FIG. 13 is a top view of the connecting rod of FIG. 12.

As shown in FIGS. 12 and 13, prior art connecting rods are typically split at dotted separation line 116. This separation line 116 extends through the center of the crank pin receiving end 102. By splitting the connecting rod 63 above the crank pin receiving end 102 in the present disclosure, a single piece bearing (without a split) of any type (plain, roller, ball, etc.) can be sealed with sealing elements that are also not split within the crank pin receiving end 102. The prior art connecting rods do not provide this feature since the separation line 116 extends through the crank pin receiving end 102, creating the need for a split bearing and sealing elements. The single piece, or non-split design, of the crank pin receiving end 102 greatly simplifies the design of the connecting rod 63 and improves the life-long lubrication of the bearing in the crank pin receiving end 102. This design adds more simplicity than typical designs as tight tolerances between the two portions of the crank end are not necessary and standard bearings can be utilized. By eliminating the separation line 116 within the crank pin receiving end 102, a sealing surface is also eliminated, thereby creating less paths for lubricating grease to escape from the bearing.

Figure 16:
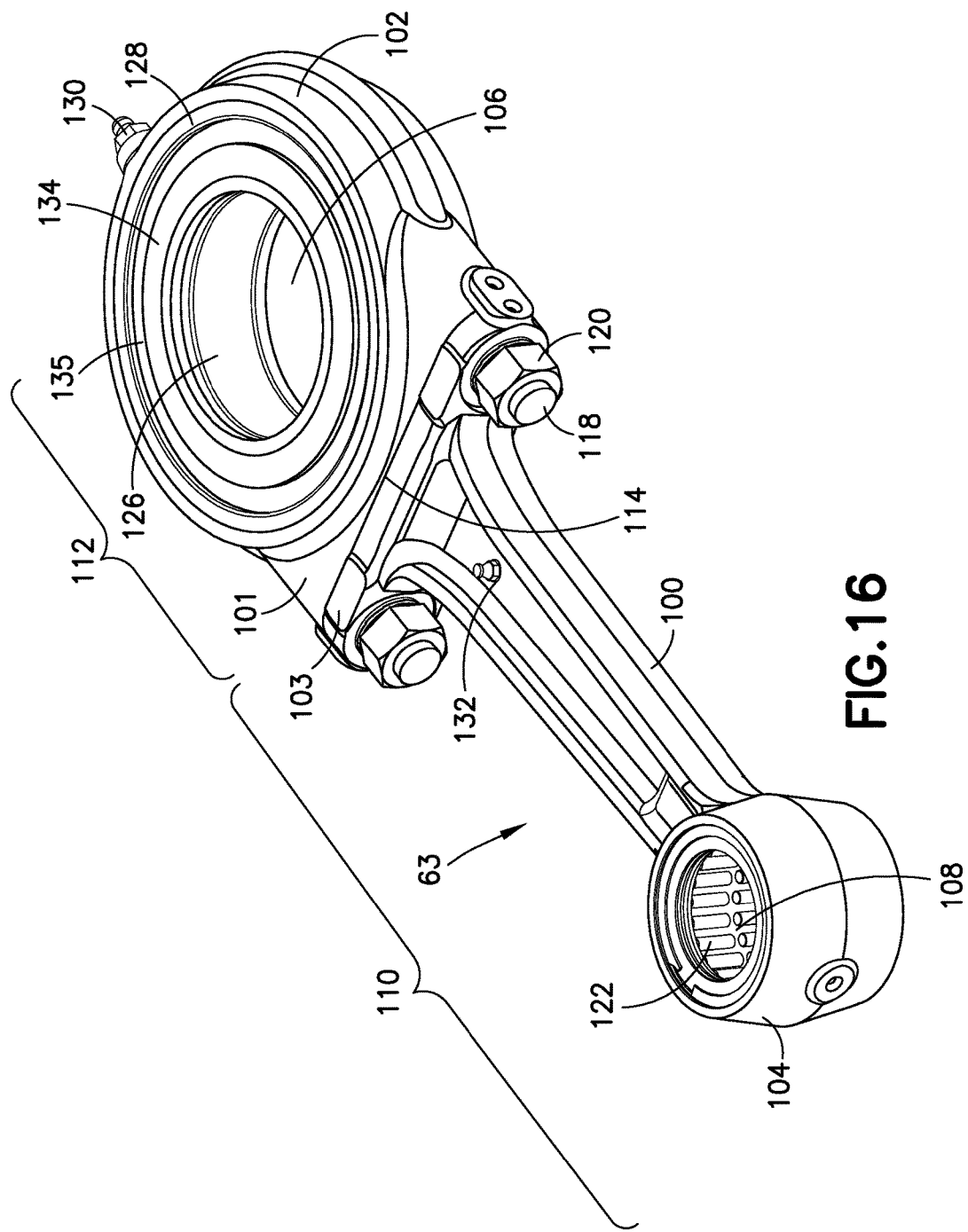
FIG. 16 is a front perspective view of the connecting rod of FIG. 12 including bearings and sealing members.
Figure 17:
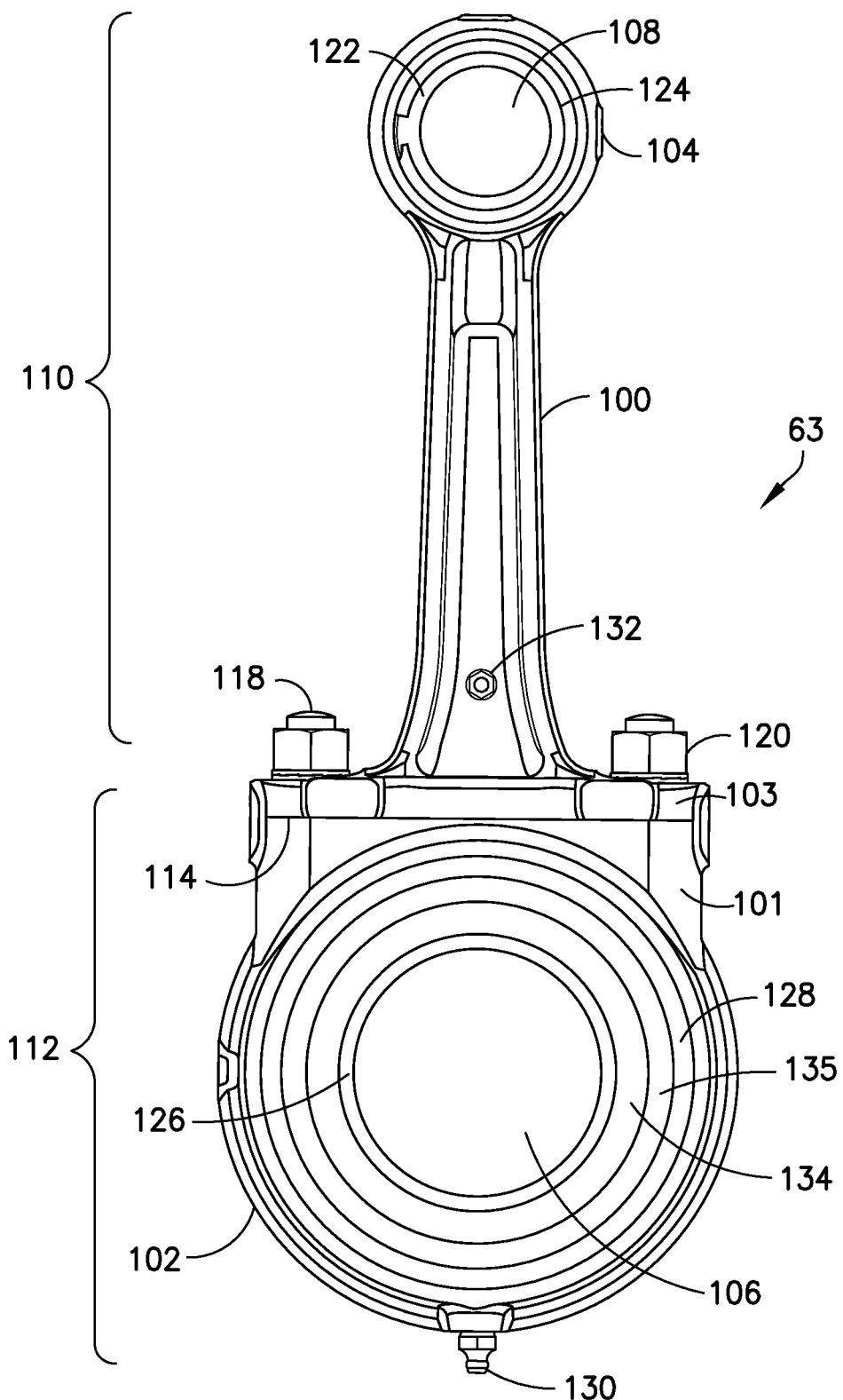
FIG. 17 is a top view of the connecting rod of FIG. 16.

As shown in FIGS. 16 and 17, a variety of bearings may be provided in the connecting rod 63. A wrist pin bearing 122 may be provided in the wrist pin receiving bore 108. The wrist pin bearing 122 may be sealed in the wrist pin receiving bore 108 using a wrist pin bearing seal 124. Likewise, a crank pin bearing 126 may be provided in the crank pin receiving bore 106. The crank pin bearing 126 may be sealed in the crank pin receiving bore 106 using a crank pin bearing seal 128. The crank pin bearing 126 and the wrist pin bearing 122 may be any type of bearing, including plain, roller, and ball, among others. A first grease fitting 130 may be provided in the crank pin receiving end 102. The first grease fitting 130 is configured to supply lubrication to the crank pin bearing 126. Likewise, a second grease port location and second grease fitting 132 may be provided in the rod member 100. The second grease fitting may be configured to supply lubrication to the wrist pin bearing 122.

The connecting rod 63 provides several design concepts that improve the ease of assembly of the connecting rod 63 and the air compressor 10 maintainability. The single piece crank pin receiving end 102 allows the crank pin bearing 126 and crank pin bearing seal 128 to be assembled as a complete subassembly prior to the assembly onto the crankshaft assembly 60. The split connecting rod 63 also allows for the replacement of the first portion 110 and the second portion 112 independently of one another. This replacement cannot be done in air compressors with single piece connecting rods as are often used in oil-free compressors. With single piece connecting rods, it is typically necessary to remove the entire connecting rod from the compressor to replace the wrist pin bearing. This means that the crank pin bearing must be disturbed and often requires the entire crankshaft assembly to be removed, which is often more complex and requires expensive maintenance. Since special tools are required for this maintenance, this is often a task that cannot be completed in the field by an end user. The split connecting rod 63 allows the first portion 110 to be removed without disturbing the crank pin bearing 126. It also simplifies the process for the end user. Similarly, the second portion 112 may be removed without disturbing the wrist pin bearing 122.

Further, the connecting rod 63 is manufactured such that the first portion 110 and the second portion 112 are not a married pair. Therefore, any first portion 110 and any second portion 112 may be combined to assemble a single connecting rod 63. This allows for the supply of a first portion 110 including a new sealed and greased wrist pin that can be installed to any second portion 112 already mounted in the air compressor 10. Traditional split connecting rods are married pairs in which the crank pin receiving end and the wrist pin receiving end of the connecting rods are machined as a single unit and then split through the center of the crank pin receiving end. The connecting rod must always remain together as a pair. By moving the separation line 114 above the crank pin receiving end 102 and utilizing locating pins 119, the first portion 110 and the second portion 112 do not need to be maintained as a married pair. This feature allows for a complete wrist pin receiving end 104 kit (wrist pin receiving end with a new wrist pin, piston assembly, and, optionally, a cylinder assembly) to be supplied as a field installed mid-life overhaul.

A method of re-greasing the crank pin bearing 126 during its lifetime is described below. Traditional deep groove single row ball bearings do not contain a greasing groove or port to allow re-greasing once in service like some roller, spherical, needle, and double row ball bearings. Lip-sealed bearings require a seal to be removed to resupply grease to the bearing. In the present connecting rod 63, the crank pin bearing 126 is sealed with externally installed crank pin bearing seals 128 (or shields). To allow for a greater grease cavity and means to install grease, a pair of spacer rings 134, 135 (FIG. 16) are installed between the crank pin bearing 126 and the crank pin bearing seal 128. The spacer rings 134, 135 may be placed on one or both sides of the crank pin bearing 126. The inner spacer ring 134 includes a lip that retains the position of the inner spacer ring 134 during assembly. The outer spacer ring 135 includes slots to allow grease to pass around the outer spacer ring 135 and into the crank pin bearing 126. The first grease fitting 130 may be aligned in fluid communication with the outer spacer ring 135.

Using this connecting rod 63 assembly, the second portion 112 can be built complete with a bearing, spacers, seals, and grease prior to installation on the compressor crankshaft assembly 60. Once installed, it can be maintained by adding grease to the crank pin bearing 126 to replace any grease that has been lost through the crank pin bearing seal 128 at the air compressor 10 mid-life when the first portion 110 is overhauled. As previously mentioned, maintenance and overhaul of the first portion 110 is permitted by the split connecting rod 63.

While an aspect of a radially configured oil-free compressor is shown in the accompanying figures and described hereinabove in detail, other aspects will be apparent to, and readily made by, those skilled in the art without departing from the scope and spirit of the invention. Accordingly, the foregoing description is intended to be illustrative rather than restrictive. The invention described hereinabove is defined by the appended claims and all changes to the invention that fall within the meaning and the range of the equivalency of the claims are to be embraced within their scope.

The invention claimed is:

1. An oil-free compressor for a rail vehicle, comprising:
a compressor housing;
a support member fastened to a bottom surface of the compressor housing to mount the compressor to the rail vehicle;
a first low pressure piston cylinder supported in the compressor housing;
a second low pressure piston cylinder supported in the compressor housing;
a first high pressure piston cylinder supported in the compressor housing;
a second high pressure piston cylinder supported in the compressor housing; and
a crankshaft assembly supported by the compressor housing and linked to pistons of the piston cylinders by respective connecting rods;
wherein the first and second low pressure piston cylinders and the first and second high pressure piston cylinders are positioned in an X-shaped configuration around an outer circumference of the compressor housing;
wherein two of the first and second low pressure piston cylinders and the first and second high pressure piston cylinders are configured as first and second lower legs of the X-shaped configuration and two of the first and second low pressure piston cylinders and the first and second high pressure piston cylinders are configured as first and second upper legs of the X-shaped configuration;
wherein the first and second lower legs of the X-shaped configuration are positioned below a horizontal plane passing through a longitudinal axis of the crankshaft assembly and the first and second upper legs of the X-shaped configuration are positioned above the horizontal plane; and
wherein the first and second lower legs of the X-shaped configuration project outward and downward from the compressor housing to lie angularly between the horizontal plane and the support member.

2. The oil-free compressor as claimed in claim 1, wherein the first and second high pressure piston cylinders are configured as the first and second lower legs of the X-shaped configuration, and the first and second low pressure piston cylinders are configured as the first and second upper legs of the X-shaped configuration.

3. The oil-free compressor as claimed in claim 1, wherein an angular distance between the two lower legs of the X-shaped configuration is greater than the distance between the two upper legs of the X-shaped configuration.

4. The oil-free compressor as claimed in claim 1, wherein the X-shaped configuration is non-symmetrical about the horizontal plane passing through the longitudinal axis of the crankshaft assembly.

5. The oil-free compressor as claimed in claim 1, wherein the X-shaped configuration is symmetrical about a vertical plane passing through the longitudinal axis of the crankshaft assembly.

6. The oil-free compressor as claimed in claim 2, wherein an angular distance between the first high pressure piston cylinder and the first low pressure piston cylinder, an angular distance between the first low pressure piston cylinder and the second low pressure piston cylinder, and an angular distance between the second low pressure piston cylinder and the second high pressure piston cylinder are equal to one another.

7. The oil-free compressor as claimed in claim 2, wherein the first and second high pressure piston cylinders are positioned below the horizontal plane passing through t h e longitudinal axis of the crankshaft assembly.

8. The oil-free compressor as claimed in claim 1, an angular distance between the two lower legs of the X-shaped configuration is less than a sum of an angular distance between the first lower and the first upper leg, an angular distance between the first upper leg and the second upper leg, and an angular distance between the second upper leg and the second lower leg of the X-shaped configuration.

9. The oil-free compressor as claimed in claim 1, wherein the compressor housing has a pentagonal cross-sectional shape.

10. An oil-free compressor for a rail vehicle, comprising:
a compressor housing;
a support member fastened to a bottom surface of the compressor housing to mount the compressor to the rail vehicle;
a first low pressure piston cylinder supported in the compressor housing;
a second low pressure piston cylinder supported in the compressor housing;
a first high pressure piston cylinder supported in the compressor housing;
a second high pressure piston cylinder supported in the compressor housing;
a crankshaft assembly supported by the compressor housing and linked to pistons of the piston cylinders by respective connecting rods; and
a cooling fan operatively connected to the crankshaft assembly;
wherein the first and second low pressure piston cylinders and the first and second high pressure piston cylinders are positioned in an X-shaped configuration around an outer circumference of the compressor housing;
wherein two of the first and second low pressure piston cylinders and the first and second high pressure piston cylinders are configured as first and second lower legs of the X-shaped configuration and two of the first and second low pressure piston cylinders and the first and second high pressure piston cylinders are configured as first and second upper legs of the X-shaped configuration;
wherein the first and second lower legs of the X-shaped configuration are positioned below a horizontal plane passing through a longitudinal axis of the crankshaft assembly and the first and second upper legs of the X-shaped configuration are positioned above the horizontal plane; and
wherein the first and second lower legs of the X-shaped configuration project outward and downward from the compressor housing to lie angularly between the horizontal plane and the support member.

11. The oil-free compressor as claimed in claim 10, wherein the first and second high pressure piston cylinders are configured as t h e first and second lower legs of the X-shaped configuration, and the first and second low pressure piston cylinders are configured as t h e first and second upper legs of the X-shaped configuration.

12. The oil-free compressor as claimed in claim 10, wherein an angular distance between the two lower legs of the X-shaped configuration is greater than the distance between the two upper legs of the X-shaped configuration.

13. The oil-free compressor as claimed in claim 10, wherein the X-shaped configuration is non-symmetrical about the horizontal plane passing through the longitudinal axis of the crankshaft assembly.

14. The oil-free compressor as claimed in claim 10, wherein an angular distance between the first high pressure piston cylinder and the first low pressure piston cylinder, an angular distance between the first low pressure piston cylinder and the second low pressure piston cylinder, and an angular distance between the second low pressure piston cylinder and the second high pressure piston cylinder are equal to one another.

15. The oil-free compressor as claimed in claim 10, wherein the X-shaped configuration is symmetrical about a vertical plane passing through the longitudinal axis of the crankshaft assembly.

16. The oil-free compressor as claimed in claim 10, wherein the cooling fan creates a flow path substantially perpendicular to the piston cylinders.

17. The oil-free compressor as claimed in claim 16, wherein each piston cylinder is positioned in the flow path of the cooling fan.

18. The oil-free compressor as claimed in claim 10, wherein the first and second high pressure piston cylinders are positioned below the horizontal plane passing through the longitudinal axis of the crankshaft assembly.

* * * * *